(12) United States Patent
Shibata

(10) Patent No.: US 7,315,943 B2
(45) Date of Patent: Jan. 1, 2008

(54) METHOD AND SYSTEM FOR AUTHENTICATING COMMUNICATION TERMINALS

(75) Inventor: Norimasa Shibata, Tokyo-to (JP)

(73) Assignee: Increment P Corporation, Tokyo (JP)

( * ) Notice: Subject to any disclaimer, the term of this patent is extended or adjusted under 35 U.S.C. 154(b) by 643 days.

(21) Appl. No.: 10/600,445

(22) Filed: Jun. 23, 2003

(65) Prior Publication Data

US 2004/0019787 A1 Jan. 29, 2004

(30) Foreign Application Priority Data

Jun. 28, 2002 (JP) ............................ P2002-189072

(51) Int. Cl.
*H04L 9/00* (2006.01)
(52) U.S. Cl. ...................... 713/168; 713/155
(58) Field of Classification Search ..................... None
See application file for complete search history.

(56) References Cited

U.S. PATENT DOCUMENTS

| | | |
|---|---|---|
| 5,784,463 A | 7/1998 | Chen et al. |
| 6,070,243 A | 5/2000 | See et al. |
| 6,173,400 B1 * | 1/2001 | Perlman et al. ............. 713/172 |
| 2001/0027527 A1 | 10/2001 | Khidekel et al. |
| 2002/0059531 A1 * | 5/2002 | Lai On ....................... 713/202 |
| 2003/0177392 A1 * | 9/2003 | Hiltgen ....................... 713/201 |

FOREIGN PATENT DOCUMENTS

EP 1 089 516 A2 4/2001

\* cited by examiner

*Primary Examiner*—Gilberto Barrón, Jr.
*Assistant Examiner*—Laurel Lashley
(74) *Attorney, Agent, or Firm*—Nixon & Vanderhye PC

(57) ABSTRACT

An example authentication system includes a server system provided with a common authentication unit (e.g., first and second authentication units) and a system controller (e.g., an access-permitting unit). The first authentication unit authenticates user-identifying information transmitted from a communication terminal and generates an access key based on the user-identifying information. The access key is transmitted from the server system to the communication terminal. The second authentication unit authenticates the access key transmitted from the communication terminal and generates a session key to access the data. The access key is transmitted from the server system to the communication terminal. The access permitting unit permits the data to be accessed within a predetermined period of time. The access is performed on the session key transmitted from the communication terminal.

19 Claims, 16 Drawing Sheets

FIG. 2

| NAME | ADDRESS | TELEPHONE No. | MAIL ADDRESS | APPLICATION No. | CREDIT CARD No. |
|---|---|---|---|---|---|
| XX XX | XXXXXXOO | 03-1234-1234 | mft@ipc.co.jp | 20020409l405 | 1234-1234-1234-1234 |
| XX XX | XXXXXXOO | 03-1233-1233 | nst@ipc.co.jp | 20020409l406 | 2222-2222-2222-2222 |
| ........ | ........ | ........ | ........ | ........ | ........ |

| EXP. DATE OF CREDIT CARD | USER ID | PASSWORD | LICENSE No. | ACCESS KEY | MANUFACTURE ID |
|---|---|---|---|---|---|
| 06-03 | 123123 | 456456 | 23217 | ack0101 | 56789 |
| 06-03 | 123456 | 456789 | 22231 | ack5555 | 56789 |
| ........ | ........ | ........ | ........ | ........ | ........ |

| MODEL NUMBER ID | HARDWARE No. | SESSION KEY | EXP. DATE OF SESSION KEY |
|---|---|---|---|
| 20345687 | 568977 | ssk0023 | 1705 |
| 20345687 | 348977 | ssk0056 | 1510 |
| ........ | ........ | ........ | ........ |

FIG. 3

| DATA REGISTRATION ITEM | ESSENTIAL ITEM FOR USER'S REGISTRATION | ESSENTIAL ITEM FOR REGULAR ACCESS TO EASY SIGN-UP | DATA REGISTRATION AT SERVER SYSTEM | DATA REGISTRATION AT NAVIGATION TERMINAL |
|---|---|---|---|---|
| NAME | ○ | | ○ | |
| ADDRESS | ○ | | ○ | |
| TELEPHONE No. | ○ | | ○ | |
| MAIL ADDRESS | ○ | | ○ | |
| APPLICATION No. | ○ | | ○ | |
| CREDIT CARD No. | ○ | | ○ | |
| EXP. DATE OF CREDIT CARD | | | ○ | |
| USER ID | ○ | ○ | ○ | ○ |
| PASSWORD | ○ | ○ | ○ | |
| LICENSE No. | ○ | ○ | ○ | ○ |
| ACCESS KEY | | ○ | ○ | ○ |
| MANUFACTURER ID | | ○ | ○ | |
| MODEL NUMBER ID | | ○ | ○ | |
| HARDWARE No. | | ○ | ○ | |
| SESSION KEY | | | ○ | ○ |
| EXP. DATE OF SESSION KEY | | ○ | ○ | |

| USER ID | LICENSE No. | ACCESS KEY | SESSION KEY |
|---------|-------------|------------|-------------|
| 123123  | 23217       | ack0101    | ssk0023     |

FIG.14A

| USER ID | PASSWORD | ACCESS KEY | MANUFACTURER ID | MODEL NUMBER ID |
|---------|----------|------------|-----------------|-----------------|
| 00001 | 0101 | ack01 | P01 | Y01-0001 |
| 00001 | 0101 | ack02 | P01 | Y02-1234 |
| ⋮ | ⋮ | ⋮ | ⋮ | ⋮ |

FIG.14B

| USER ID | PASSWORD | ACCESS KEY | MANUFACTURER ID | MODEL NUMBER ID |
|---------|----------|------------|-----------------|-----------------|
| 00001 | 0101 | ack01 | P01 | Y01-0001 |
| 00001 | 0101 | ack01 | P01 | Y02-1234 |
| ⋮ | ⋮ | ⋮ | ⋮ | ⋮ |

METHOD AND SYSTEM FOR AUTHENTICATING COMMUNICATION TERMINALS

BACKGROUND OF THE INVENTION

The present invention relates to a method and a system for authenticating communication terminals, such as personal computers, mobile phones and on-vehicle navigation terminals, which are required to establish connections with a server system when receiving various types of services from the server system via communication means.

In recent years, communication terminals, such as personal computers (PCs) with a communication performance, have frequently been involved in information-service network communication systems that require each communication terminal to be authenticated. In such a typical system, a communication terminal is used, which is entitled to operate SSL (Security Sockets Layer) with a technique of encrypting documents to be transferred in forms. A server system incorporated in such a system receives user-identifying information, such as a password, given from such communication terminal through communication means such as the Internet, and authenticates the communication terminal (i.e., a user who handles such communication terminal). Thus, only when it is determined that the authentication reveals an affirmative result, the server system is permitted to provide the communication terminal with data requested by the user (i.e., data service).

The foregoing conventional authentication technique is directed to the communication terminal that is compatible with the SSL. As long as such a type of communication terminal can be used, it is considered that there will be almost no problem in security. However, if a communication terminal which is smaller in data storage is used or a communication terminal which is not compatible with the SSL is subjected to authentication, there arises a possibility that user-identifying information such as a password is leaked out. If such a case happens, some serious problems including unauthorized accesses may occur.

SUMMARY OF THE INVENTION

The present invention has been made in view of the above circumstances, and an object of the present invention is, therefore, to provide a method and system for authenticating communication terminals, which is able to prevent unauthorized accesses without decreasing data transfer speeds, thus raising security, even when a communication terminal with a smaller capacity for data storage is employed.

In order to accomplish the above object, as one aspect of the present invention, there is provided an authentication system in which a communication terminal is communicably connected to a server system via communication means, wherein an authenticated result for a user who handles the communication terminal is made reference to provide data from the server system to the communication terminal via the communication means, the server system comprising: a first authentication unit configured to authenticate user-identifying information transmitted from the communication terminal and generate first key information based on the user-identifying information so that the first key information is transmitted from the server system to the communication terminal; a second authentication unit configured to authenticate the first key information transmitted from the communication terminal and generate second key information to access the data based on the first key information so that the second key information is transmitted from the server system to the communication terminal; and an access permitting unit configured to permit the data to be accessed within a predetermined period of time, the access being carried out on the basis of the second key information transmitted from the communication terminal.

Accordingly, the second key information is able to have a predetermined period of time that serves as a valid time, only during which time a user is permitted to access data stored in the server system. Thus, under authentication with no SSL involved, it is possible to reduce use of a password down to a level as lower as possible. In addition, even when the communication terminal of which data storage capacity is relatively lower is employed, unauthorized accesses to data in the server system can be prevented without lowering data transfer speeds, thus providing a remarkable enhancement in security.

It is preferred that the authentication system further comprises a second server system different from the server system, wherein the second server system comprises a third authentication unit configured to authenticate the second key information generated the server system. Accordingly, because the third authentication unit is responsible for authentication of the second key information, a calculation load on the server system can be suppressed from being raised.

Preferably, the second server system is configured to set a period of time to permit the access to the data on the basis of a time instant at which the second key information is acquired and an accessible period of time remaining in the predetermined period of time for the access. As a result, a time to permit a user to access the data can be set in an accurate and steadier fashion, even when a second server system.

As another aspect of the present invention, there is provided a server system communicably connected with a communication terminal via communication means, wherein an authenticated result for a user who handles the communication terminal is made reference to provide data from the server system to the communication terminal via the communication means, the server system comprising: a first authentication unit configured to authenticate user-identifying information transmitted from the communication terminal and generate first key information based on the user-identifying information so that the first key information is transmitted from the server system to the communication terminal; a second authentication unit configured to authenticate the first key information transmitted from the communication terminal and generate second key information to access the data based on the first key information so that the second key information is transmitted from the server system to the communication terminal; and an access permitting unit configured to permit the data to be accessed within a predetermined period of time, the access being carried out on the basis of the second key information transmitted from the communication terminal. Hence, this server system has the advantages identical to those described in the foregoing authentication system.

It is preferred that the first key information is an access key to access to the data stored in the server system and the second key is a session key for transmission control of the data. Therefore, under the authentication with no SSL employed, the first and second key information can be used as a kind of password, thus eliminating the necessity of adopting the password.

It is also preferred that in cases where the user-identifying information is transmitted using a second communication terminal other than the communication terminal, the first authentication unit transmits, to the second communication terminal, a second access key generated based on the user-identifying information provided from the second communication terminal, as the second access key being regarded as the access key. Thus, the same access key is given to the same user, which makes it possible to one user to use a plurality of communication terminals based on the same access key.

Still preferably, the communication terminal is configured to previously have predetermined terminal-identifying information being sent to the server system together with the user-identifying information. Accordingly, because the sever system is able to receive terminal-identifying information, the server system uses such information so that the security in the system is up-graded largely.

As another aspect of the present invention, there is provided an authentication method, in which a communication terminal is communicably connected to a server system via communication means, wherein an authenticated result for a user who handles the communication terminal is made reference to provide data from the server system to the communication terminal via the communication means, comprising the steps of: authenticating user-identifying information transmitted from the communication terminal; generating first key information based on the user-identifying information so that the first key information is transmitted from the server system to the communication terminal; authenticating the first key information transmitted from the communication terminal; generating second key information to access the data based on the first key information so that the second key information is transmitted from the server system to the communication terminal; and permitting the data to be accessed within a predetermined period of time, the access being carried out on the basis of the second key information transmitted from the communication terminal. Hence, this method is able to provide the advantages identical to those described in the foregoing authentication system.

By way of example, the first key information is an access key to access to the data stored in the server system and the second key is a session key for transmission control of the data. When using this technique, there is no necessity of adopting a password.

Still, as another aspect of the present invention, there is provided a computer-readable program installed in a server system communicably connected with a communication terminal via communication means, wherein an authenticated result for a user who handles the communication terminal is made reference to provide data from the server system to the communication terminal via the communication means, the program makes a computer realize the functions of: first authentication means for authenticating user-identifying information transmitted from the communication terminal and generate first key information based on the user-identifying information so that the first key information is transmitted from the server system to the communication terminal; second authentication means for authenticating the first key information transmitted from the communication terminal and generate second key information to access the data based on the first key information so that the second key information is transmitted from the server system to the communication terminal; and access permitting means for permitting the data to be accessed within a predetermined period of time, the access being carried out on the basis of the second key information transmitted from the communication terminal. Hence, this program makes it possible to provide the server system with the advantages identical to those described in the foregoing authentication system.

Still, as another aspect of the present invention, there is provided a recording medium storing thereon the above computer-readable program installed in the server system communicably connected with the communication terminal via the communication means.

BRIEF DESCRIPTION OF THE DRAWINGS

Other objects and aspects of the present invention will become apparent from the following description and embodiments with reference to the accompanying drawings in which:

FIG. 2 illustrates the structure of data stored in a database unit in a server system shown in FIG. 1;

FIG. 3 illustrates data items noted in FIG. 2;

FIG. 14A illustrates the structure of data when a single access key is used;

FIG. 14B illustrates the structure of data when a single access key is used for a plurality of communication terminals;

DETAILED DESCRIPTION OF PREFERRED EMBODIMENTS

Referring to the accompanying drawings, preferred embodiments of the present invention will now be explained.

The following embodiments will be described about an authentication system for communications apparatuses according to the present invention, in which communication terminals, which include communication car navigation systems and other devices such as personal computers (PCs) and/or mobile phones, are communicably connected with a server system via the Internet functioning as communication means. In this authentication system, the server system receives user-identifying information provided from a communication terminal via the Internet, authenticates the user-identifying information about whether or not the information indicates a user who is allowed to use a communication car navigation system of which terminal is mounted on a vehicle, and provides the communication car navigation system with various types of data, such as map data, if the authentication reveals an affirmative result.

First Embodiment

Figure 1:
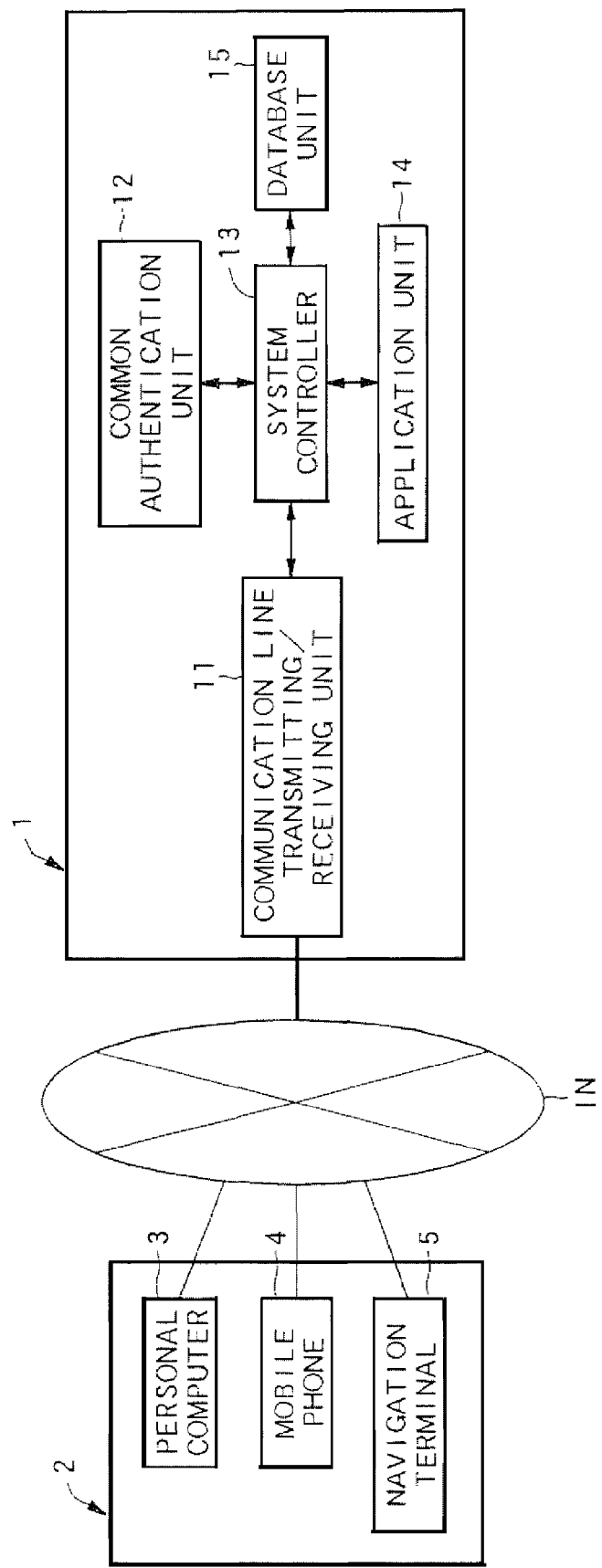
FIG. 1 is a block diagram showing a schematic configuration of an authentication system according to a first embodiment of the present invention.

FIG. 1 shows a schematic diagram of the confirmation of an authentication system for communications apparatuses according to a first embodiment of the present invention.

As shown in FIG. 1, an authentication system for communications apparatuses is provided with a communication-service server system 1 (hereafter, simply referred to as a "server system") and communication terminals 2 communicably mutually communicated with the server system 1 via the Internet IN. The communication terminals 2 include a personal computer (PC), a mobile phone, and a navigation terminal 5 incorporated in a communication car navigation system.

In the system shown in FIG. 1, there are provided only one per each of the personal computer (hereafter, simply referred to as PC) 3, mobile phone 4 and navigation terminal 5, but this configuration is not a definitive list. In practice, there may be one or more PCs, one or more mobile phones, and one or more navigation terminals in the authentication system.

The PC 3 (or mobile phone 4), which is a communication terminal, accesses to a portal site at the server system 1, in which a user is allowed to input user's data, such as user's mail address, at the portal site, thus the user's data being sent to the server system 1 through the Internet IN, and allowed to input a credit number at the portal site, thus the credit number being sent to the server system 1 through the Internet IN. In addition, each PC 3 (or mobile phone 4) is configured to receive not only an application number transmitted from the server system 1 but also user accounts including a user ID (identification), password, and license number, which serve as user-identifying information.

Meanwhile, the server system 1 has the configuration that enables communication of various types of key information with the PC 3 (or mobile phone 4), which is carried out as follows. That is, when receiving, from the navigation terminal 5 via the Internet IN, the user accounts that were given through the PC 3 (or mobile phone 4), the server system 1 performs authentication on the user accounts, so that, if the authentication succeeds, the server system 1 provides the navigation terminal 5 with an access key serving as the first key information. When receiving the access key and the user ID from the navigation terminal 5 via the Internet IN, the server system 1 authenticates the received access key, so that, if the authentication succeeds, the server system 1 provides the navigation terminal 5 with a session key serving as the second key information. Moreover, in the case of receiving the session key from the navigation terminal 5 through the Internet IN, the server system 1 gives the navigation terminal 5 data that are desired by the user.

The server system 1 will now be detailed component by component.

As shown in FIG. 1, the server system 1 is provided with a communication line transmitting/receiving unit 11, a common authentication unit 12 that has the functions of the first and second authentication units according to the present invention, a system controller 13, an application unit 14, and a database unit 15 of which storage is composed of, for example, a hard disk device. The system controller 13 includes the functions of an access-allowing unit according to the present invention, which permits an access based on the session key to be done only within a certain period of time.

Of these components, the communication line transmitting/receiving unit 11 works as an interface between the Internet IN (i.e., to each communication terminal 2) and the system controller 13 in the server system 1. Practically, the communication line transmitting/receiving unit 11 performs a predetermined type of processing on data provided via the internet IN, and supplies the data resultant from the processing to the system controller 13. Further, in response to receiving from the system controller 13 data to be transmitted to a specific communication terminal 2, the communication line transmitting/receiving unit 11 applies a predetermined type of processing to the data such that the processed data is sent, as data from the server system 1, to the communication terminal 2 via the Internet IN.

The common authentication unit 12 is configured to perform issuance and management of both the access and session keys.

The system controller 13 is responsible for control to permit an access based on the foregoing session key, as a valid access, to be performed during a given interval of time, in addition to control of each component necessary for processing both of data that has been received via the communication line transmitting/receiving unit 11 and data stored in the database 15.

The application unit 14 is configured to analyze the data sent from the user and to instruct the system controller 13 to acquire, from the database unit 15, data required for the analysis.

The database unit 15 memorizes all kinds of data necessary for navigation processing, such data including, as shown in FIGS. 2 and 3, user's name, address, telephone number, mail address, application number, credit card number, expiration date of credit card, user ID (identification), password, license number, access key, manufacture ID, model number ID, hardware number, session key, and expiration time of session key; map data to be displayed on a display screen of the navigation terminal 5, various kinds of data required for route processing, both positional data and content data at various points on a map to be displayed on the display screen of the navigation terminal 5; point data necessary for execution of navigation processing; and users' data about users who use the navigation terminal 5. These kinds of data are read out at necessary timing from the database 15 and sent to the system controller 13.

Figures 4, 5:
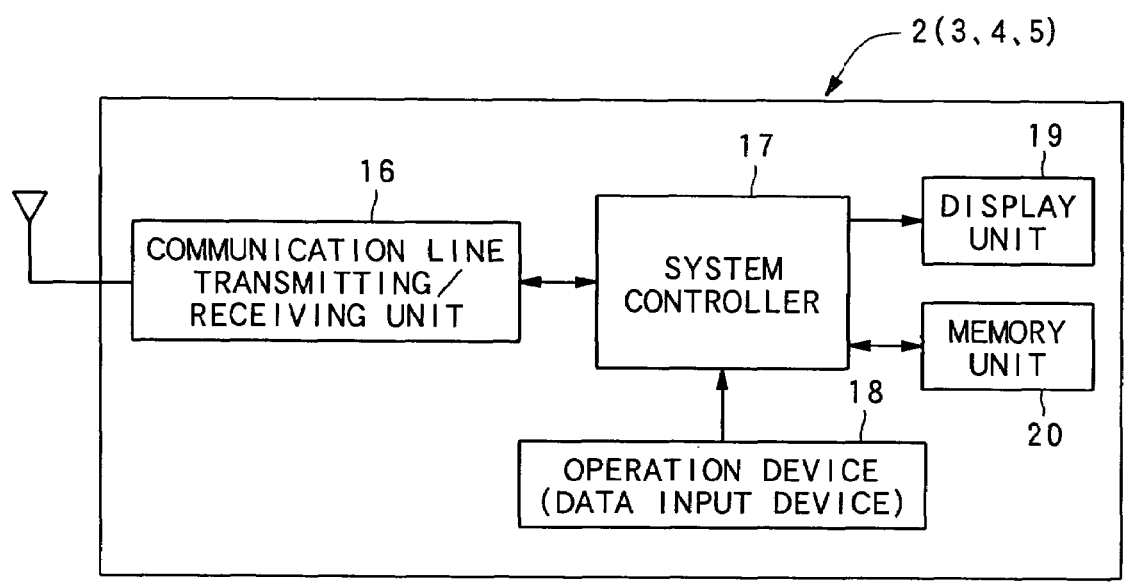
FIG. 4 is a block diagram showing a schematic configuration of each communication terminal (such as PC, mobile phone, and navigation terminal)
FIG. 5 illustrates the structure of data stored in a memory unit in FIG. 4.

Each communication terminal 2 (i.e., PC 3, mobile phone 4, or navigation terminal 5) is equipped with, as shown in FIG. 4, a communication line transmitting/receiving unit 16, a system controller 17, an operation device 18 serving as a data input device, a display unit 19, and a memory unit 20.

In this configuration, the communication line transmitting/receiving unit 16 is formed to have the following functions. This transmitting/receiving unit 16 applies a predetermined type of input processing to terminal data received through the Internet IN, and sends the processed data, as processed terminal data, to the system controller 17. On the other hand, when receiving processed terminal data that should be sent from the system controller 17 to the server system 1, the communication line transmitting/receiving unit 16 performs a predetermined type of output processing on the processed terminal data that has been received, before sending the processed data, as terminal data, to the server system via the Internet IN.

The system controller 17 uses both data received through the Internet IN and data stored in the memory unit 20 to control each of the components in the communication terminal 2.

The operation device 18 has the configuration that responds to operations concerning various types of navigation processing, such as designation of a map to be displayed on the display unit 19 and setting a destination on the map, and produces input data indicative of such operations to send the input data to the system controller 17.

The display 19 is used to visualize a desired map, positions and routes of various points on the map, and others.

The memory unit 20 is configured to memorize a variety of types of data, which include user accounts (corresponding to user-identifying information) formed as shown in FIG. 5 to include a user ID (identification), a password, a license number, an access key, and a session key, which have been transmitted from the server system 1; and data such as map data supplied from the system controller 17, which should be stored in a temporal manner so that the data can be read out any time for display or other processing.

Figure 6:
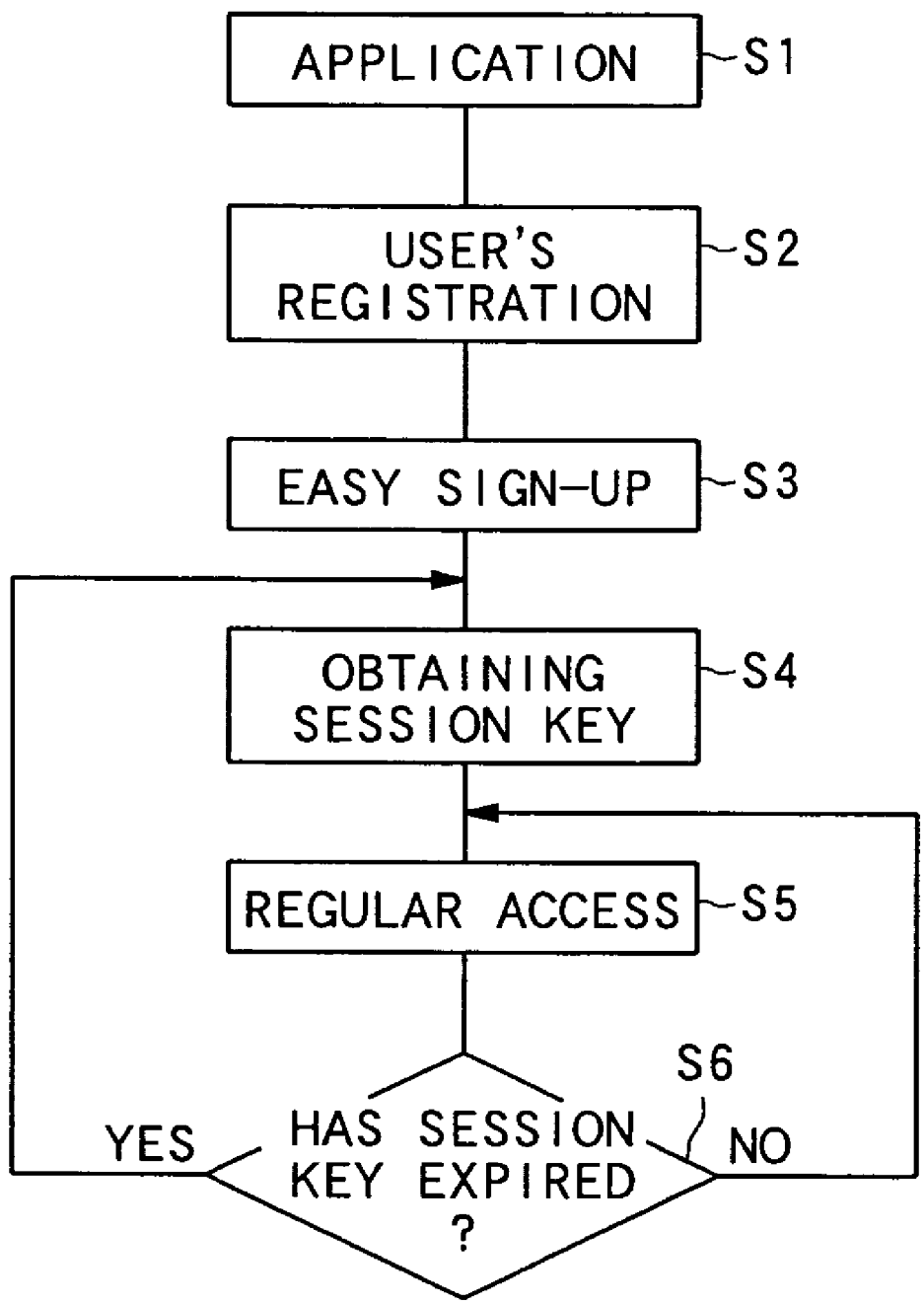
FIG. 6 outlines a flowchart showing the processing to establish a connection for navigation, which is carried out by the authentication system of the first embodiment.

Next, referring to FIG. 6, the processing necessary for a connection for navigation, which is carried out by the authentication system for communications system according to the first embodiment, will now be outlined.

FIG. 6 indicates an outline of processing carried out to establish a connection of the navigation terminal to the server system 1. When the processing shown in FIG. 6 is activated, a user is able to access, through the user's PC 3, a portal site provided by the server system, and input a user's mail address and other necessary data on the portal site. Thus the SSL (Security Sockets Layer) can be used to apply for navigation to the server system 1. In response to this operation, the server system 1 issues an application number and sends the application number to the user's PC 3 through an electronic mail (step S1).

Then, the user is to input a credit card number and other necessary data on the portal site, so that those pieces of information are sent to the server system 1 on the SSL for user registration. The server system 1 responds to this transmission by issuing user accounts (i.e., user ID, password, and license number) and sending these user accounts on the SSL to the user's PC 3 (step S2).

Another embodiment is that devices other than the PC 3, that is, the mobile phone 4 in the present embodiment, can be used, so that the processing at steps S1 and S2 is carried out for the mobile phone 4. If a user does not have such a communication terminal, the user is able to receive the foregoing user accounts via a letter delivered by mail or notification by the telephone, from an administrator who administers the server system 1.

Accordingly the user is able to input the received user accounts (i.e., user ID, password and license number) into the navigation terminal 5 so that the user accounts are transmitted, as easy sign-up data, to the server system 1 via the Internet IN. In response to this transmission, the server system 1 will authenticate the received user accounts to produce an access key, the access key being sent back to the navigation terminal 5, provided that the authentication succeeds (step S3).

Thus the user is able to input both of the received access key and the user ID at the navigation terminal 5 so as to be sent to the server system 1 by way of the Internet 1. The server system 1 responds to this transmission by performing authentication on both the access key and the user ID. Performing the authentication, if being passed, is followed by generating a session key, which is sent back to the navigation terminal 5 (step S4).

When the user gives both of the received session key and user ID to the navigation terminal 5 so that the session key and user ID are transmitted to the server system 1 via the Internet IN, the server system 1 is able to begin a designated service by supplying designated data, such as map data, to the navigation terminal 5 (step S5).

The server system 1 provides the navigation terminal 5 with the designated data, such as map data, via the Internet IN until a period of valid time (for example, 5 minutes) given to the session key will expire (NO at step S5). When the valid period of time of the session key expires (YES at step S5), the processing in FIG. 1 is returned to step S4, thereby permitting the user to acquire the session key again as long as the user desires.

The processing carried out at each step in FIG. 6 will now be explained in detail with reference to FIGS. 7 to 11.

Figure 7:
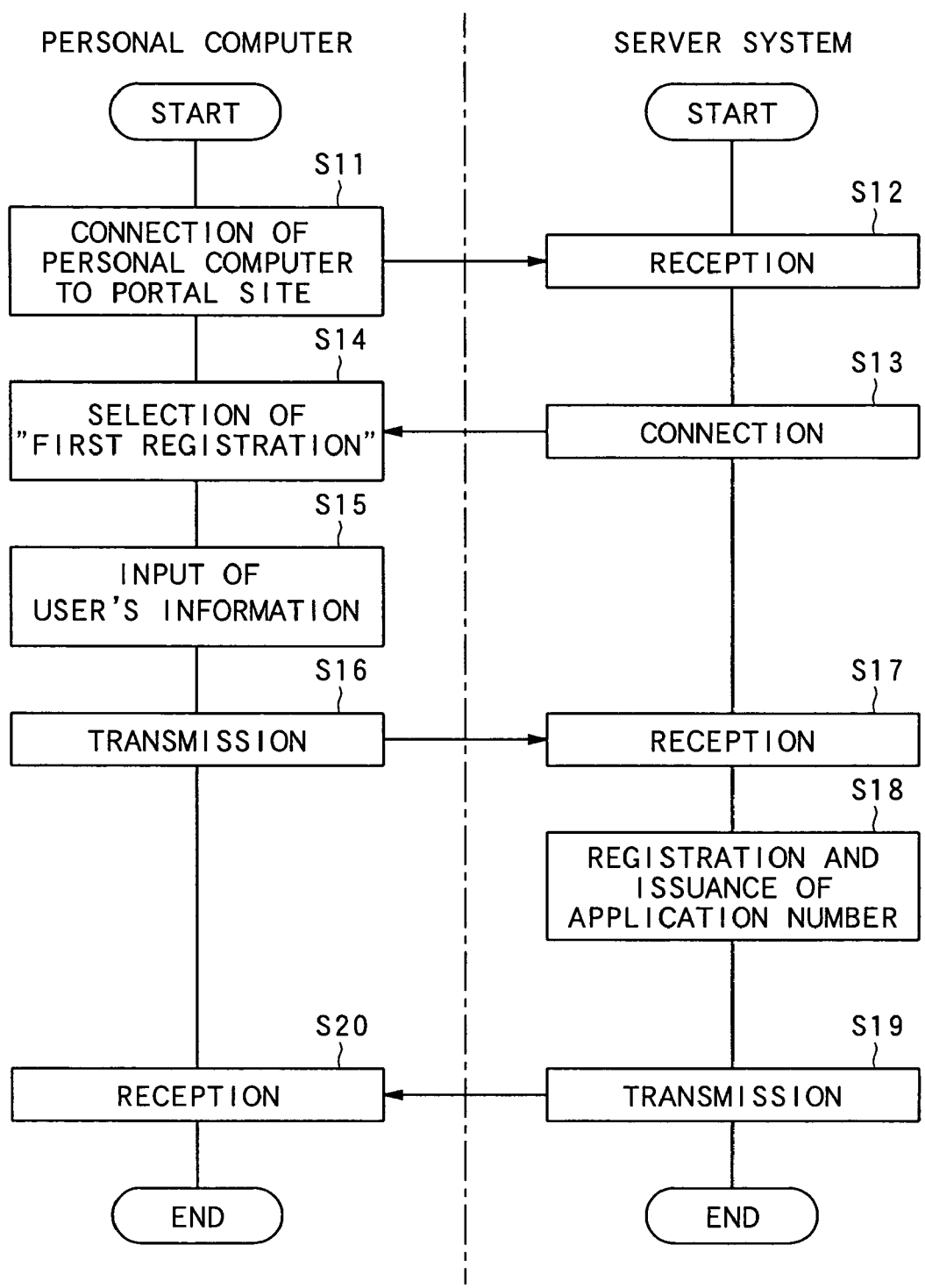
FIG. 7 details the processing at step S1 in FIG. 6, which is the processing for user registration (granting an application number)

FIG. 7 details the processing executed at step S1 in FIG. 6, which shows a flowchart for user registration (granting an application number).

As shown in FIG. 7, the processing for the user registration (granting an application number) is carried out. First, a user requests a connection of the user's PC 3 to a portal site provided by the server system 1, the server system 1 responds to this request by establishing the connection. The user is able to see the portal site represented by the display unit 19 of the PC 3, so that the user selects "the first registration" on the display unit 19 (steps S11 to S14).

The user then inputs pieces of information about the user, such as an electronic mail address and name, into the PC 3, thus the user information being sent to the server system 1 on the SSL (steps S 15 and S16). The server system 1 thus receives the user information (which is exemplified in FIGS. 2 and 3) for registration, and issues an application number. Hence from the server system 1, the application number is sent together with a payment screen URL (Uniform Resource Locator) to the user's PC 3 by an electronic mail, so that the PC 3 receives such information (steps S17 to S20).

Figure 8:
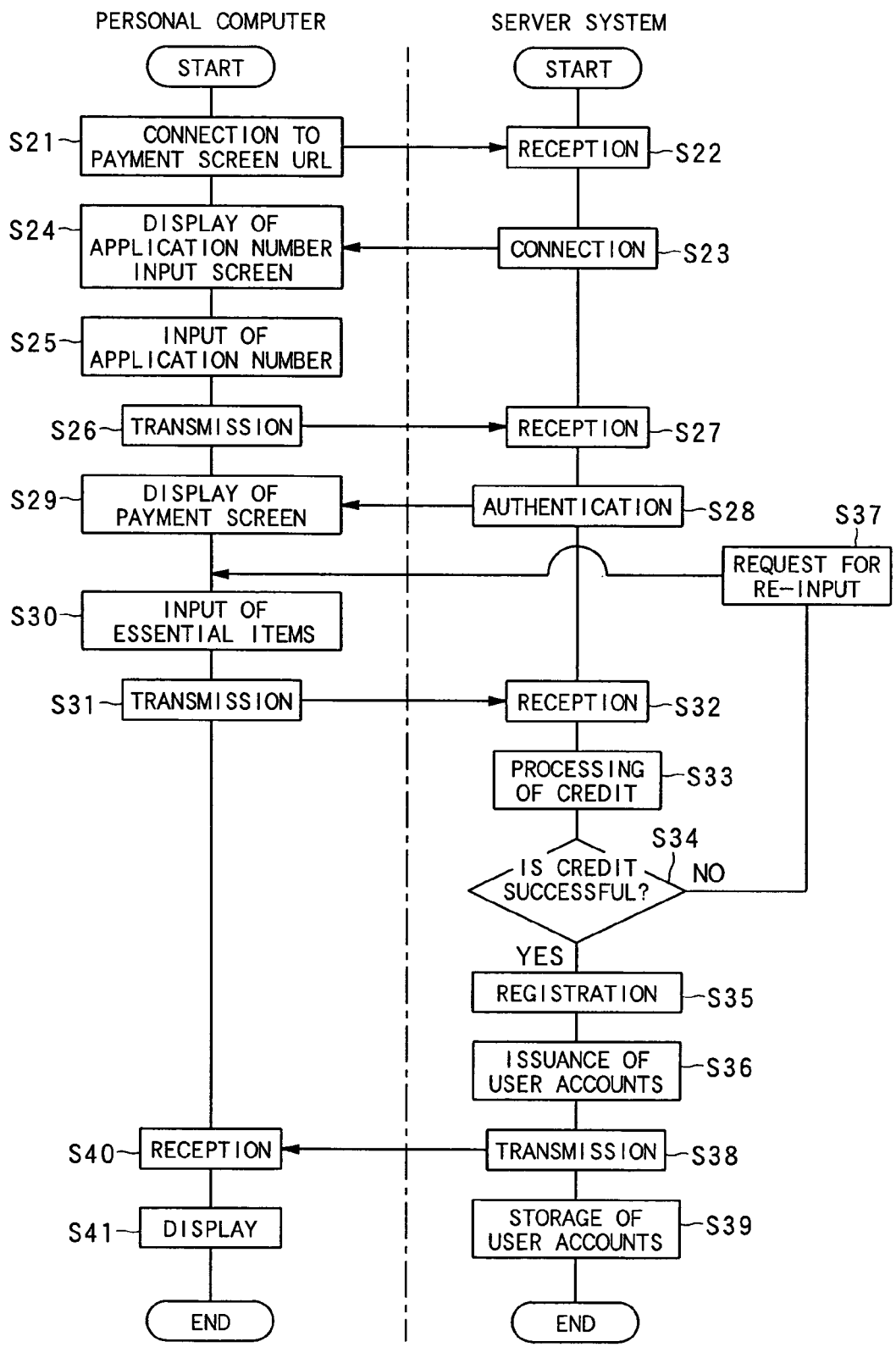
FIG. 8 details the processing at step S2 in FIG. 6, which is the processing for user registration (granting user accounts)

FIG. 8 shows in detail a flowchart for the processing carried out at step S2 in FIG. 6, in which the processing for user registration (granting user accounts) is executed.

As shown in FIG. 8, the user registration (granting user accounts) is initiated by connecting the user's PC 3 to the payment screen URL provided by the server system 1. The server system 1 responds to this connection by making the PC 3 display an application number input screen thereon (steps S21 to S24).

Hence the user inputs an application number into the PC 3 to transmit data indicative of the application number toward the server system 1 on the SSL (steps S25 and S26).

In response to this, the server system 1 accepts the data of the application number to make the application number undergo authentication carried out therein. On completion of the authentication of the application number (provided that the authentication succeeds), the server system 1 sends back information indicative of a payment screen to the user's PC 3 on the SSL, thus the payment screen being displayed on the PC 3 (steps S27 to S29).

Then the user uses the payment screen displayed on the PC 3 to fill in necessary items, such as a credit card number and the expiration date of the card, on the screen, so that the filled-in information in relation to the payment is transmitted to the server system 1 on the SSL (steps S30 and S31). On reception of the filled-in item information about the payment, the server system 1 carries out credit exposure management as regarding the user. When finding out the success of the credit (YES at step S34), the server system 1 records therein both the credit number and the card expiration date, before issuing user accounts (user ID, password, and license number) (steps S35 and S36). On the other hand, the credit fails (NO at step S34), the server system 1 moves to step S37 to request the user's re-input of a credit card number, a card expiration date, and others.

Further, the server system 1 sends to the user's PC 3 the issued user ID, password, and license number on the SSL, which is also accompanied by the notification on the electronic mail. After this, the server system 1 stores the user accounts into the database unit 15 (steps S38 and S39).

The user's PC 3 operates to receive the user ID, password, and license number that have been given by the server system 1 and display them on the display unit 19 (steps S40 and S41).

Figure 9:
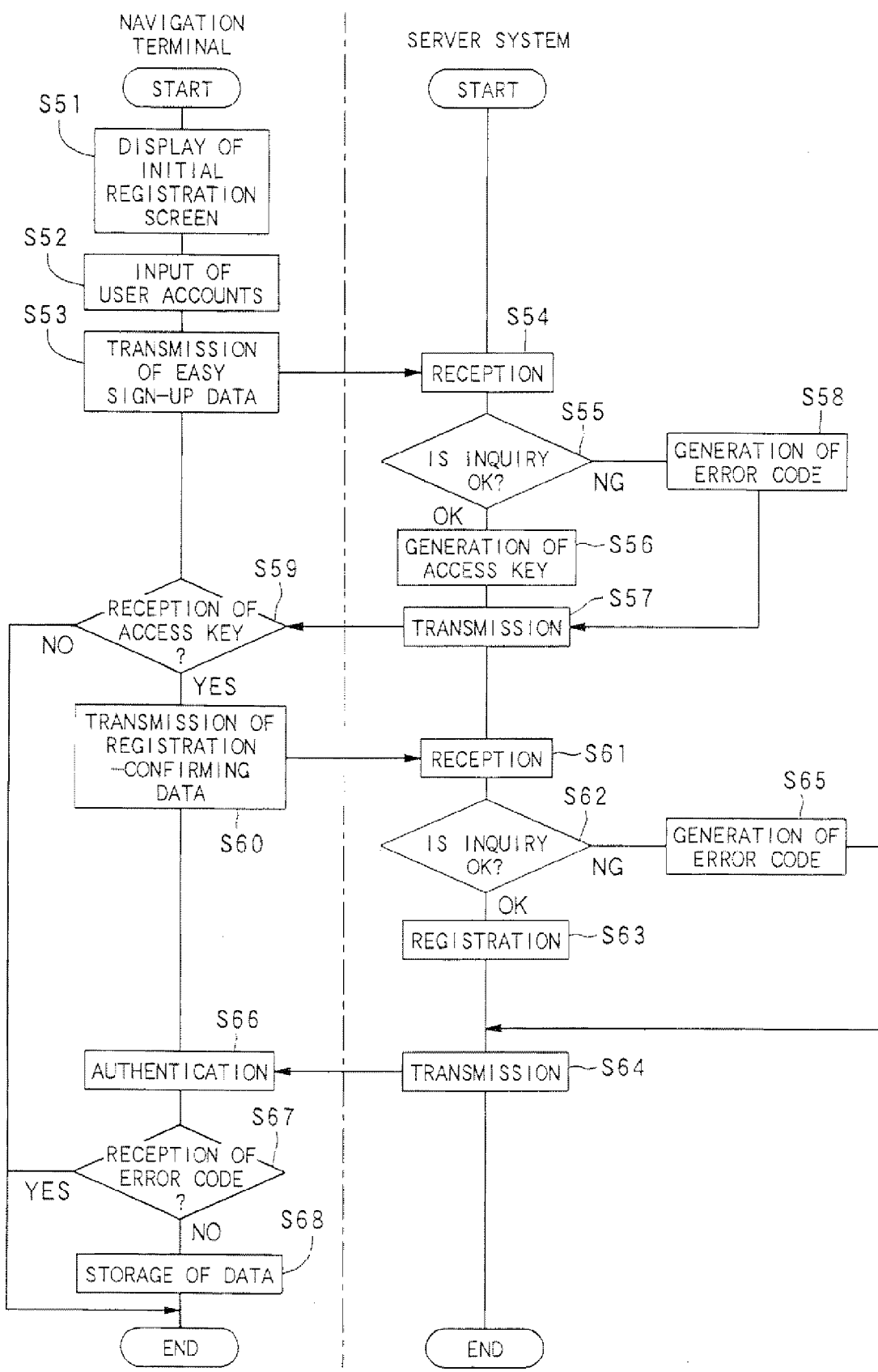
FIG. 9 details the processing at step S3 in FIG. 6, which is the processing for easy sign-up.

FIG. 9 shows in detail the processing carried out at step S3 in FIG. 6, which is a flowchart for easy sign-up processing. The easy sign-up processing is performed on condition that a hardware number of the navigation terminal 5 used by the user cannot be acquired and the user registration (i.e., the input of a credit card number) has been completed.

As shown in FIG. 9, the easy sign-up processing proceeds, in which an initial registration screen is displayed on the display of the navigation terminal 5, and user accounts (i.e., user ID, password, and license number) are filled in a form displayed thereon (steps S51 and S52). Then the user ID, password, and license number are transmitted to the server system 1 via the Internet IN, in the form of easy sign-up data accompanied by a manufacture ID and a model number ID given to the navigation terminal 5 (step S53).

In the processing at step S53, the password is superposed on data transmitted on the commutation line of the Internet IN, without using the SSL. This processing is carried out only one time when the easy sign-up data is transmitted. In cases where this way is adopted, the same encryption function (for example, a hash function) is installed in both the navigation terminal 5 and the server system 1, in which an encrypted password is transmitted from the navigation terminal 5 to the server system 1 and it is determined by the server system 1 if or not the encrypted password agrees with a predetermined password preserved in advance.

On reception of the foregoing easy sign-up data, the server system 1 performs an inquiry by determining whether or not the user ID has been registered, the user ID and password are valid, and the access key has yet to be issued (steps S54 and S55). In cases where an inquired result is acceptable (OK), an access key is generated by the server system 1 (step S56), before being moved to the processing at step S57.

Meanwhile, the foregoing inquiry reveals a negative result (NG), an error code is generated at step S58, before being shifted to the processing at step S57. The access key is changed every time it is generated. In addition, even when the access key is required for a user ID which has already been registered (for instance, the user's terminal is transferred to others), the access key is generated differently. This way of generating access keys prevents the same user accounts from being provided to a plurality of navigation terminals 5.

Then at step S57, the access key or the error code is transmitted from the server system 1 to the navigation terminal 5. The navigation terminal 5 waits for an access key with performing the determination about whether or not an access key has been received (step S59). In the case that the access key has been received (YES at step S59), the navigation terminal 5 returns both the user ID and the access key to the server system 1 as registration-confirming data (step S60). In contrast, when the access key has not been received (NO at step S59), the processing is terminated.

By the way, there is a possibility that the access key generated by the server system 1 encounters some kinds of disturbances (e.g., communication impossibility or the navigation terminal being presented in an outer area which is not covered by the server system); if things come to the worst, the access key may not reach the navigation terminal 5. Accordingly, when the access key has not been transferred to the navigation terminal 5, it is required for the user to do again the easy sign-up processing when being connected to the server system 1. In addition, the server system 1 returns an error signal that indicates that there has already existed the access key. These situations may annoy the user who is forced to perform error processing. With considering the drawback, in the present embodiment, at step S60, the access key which has been received by the application of the navigation terminal 5 is sent together with the user ID to the server system 1. This enables the transmission of the access key to be confirmed.

The server system 1 receives both the access key and the user ID at step S61, and then makes an inquiry to know whether both the access key and the user ID are valid or not (step S62). When the inquiry shows that both the access key and the user ID are valid (OK), the manufacturer ID, model number ID and access key are newly registered at step S63, before being moved to step S64. In the server system 1, there exist the manufacturer ID, model number ID and access key which have already been registered. By contrast, the foregoing inquiry shows that both the access key and the user ID are invalid (NG), an error code is generated at step S65, and then proceeding to step S64.

At step S64, a registration end notification or the error code is transmitted from the server system 1 to the navigation terminal 5, while at step S66, the registration end notification or the error code is received by the navigation terminal 5 for performing the analysis of the received information. In the case of receiving the error code (YES at step S67), the processing is terminated, while in the case of non-reception of the error code (NO at step S67), the user ID, access key, and license number are stored in the memory unit 20 of the navigation terminal 5 to terminate the processing (step S68). In this processing, the access key is stored in the memory unit 20 in an invisible form for the user and the password is not stored in the memory unit 20.

Figure 10:
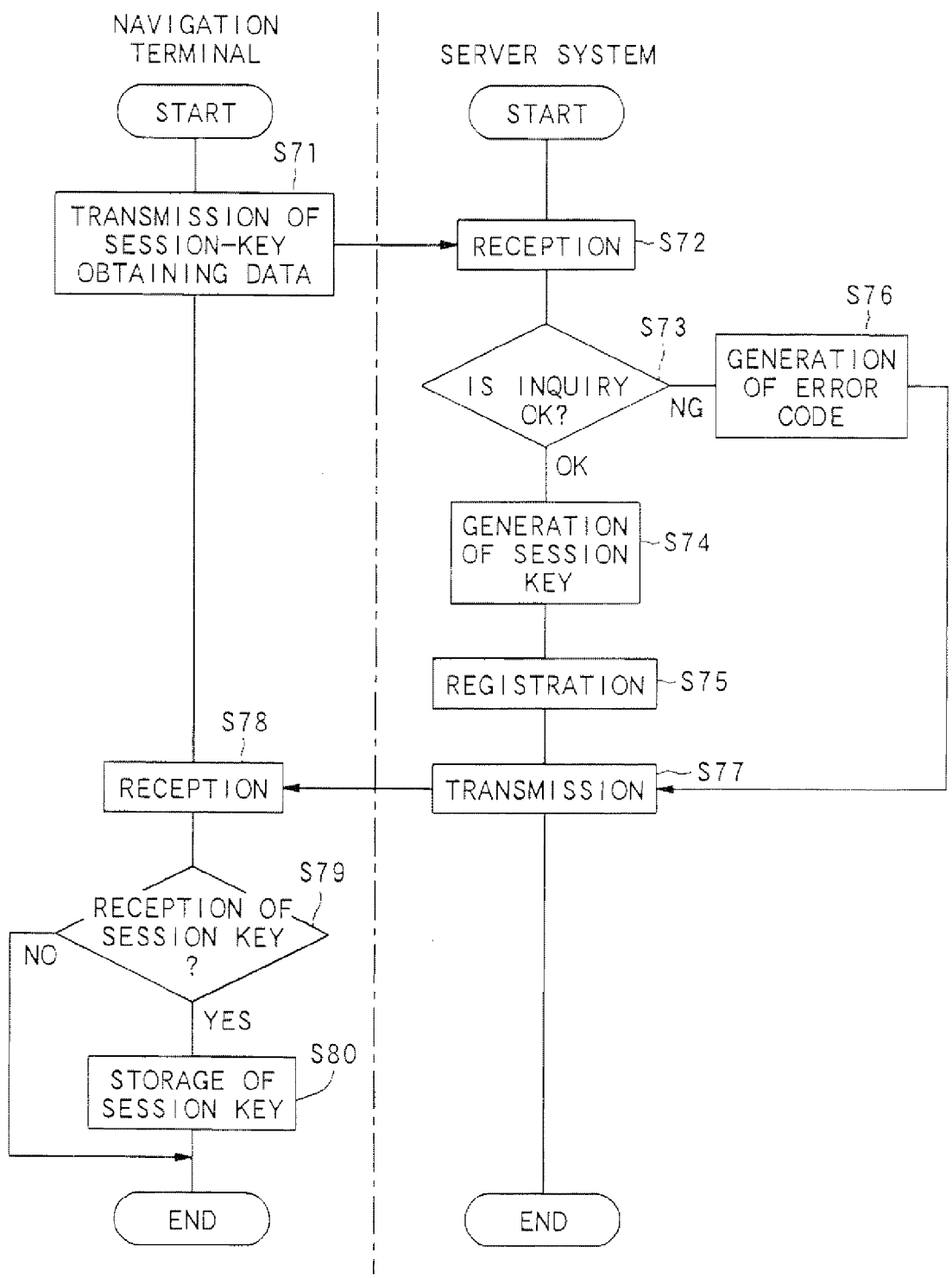
FIG. 10 details the processing at step S4 in FIG. 6, which is the processing for obtaining a session key.

FIG. 10 shows the processing carried out at step S4 in FIG. 6, which is the flowchart for obtaining a session key.

As shown in FIG. 10, in the session key obtaining processing is started by transmitting both the user ID and the access key, as session key obtaining data, from the navigation terminal 5 to the server system 1 (step S71). In response to this transmission, the server system 1 receives both the user ID and the access key (step S72), and authenticates the received data through an inquiry (step S73). In this inquiry, it is determined whether or not the received user ID has already been registered and there is a consistency between the received user ID and the received access key. In cases where the determination reveals that the user ID has already registered and there is a consistency between the user ID and the access key (OK at step S73), the processing is moved to step S74, wherein a session key to which a period of valid time (for example, 5 minutes) is preset is produced, and the session key and the valid time are registered (step S75).

By contrast, if the determination at step S73 shows that the user ID has not been registered and there is no consistency between the user ID and the access key (NG at step S73), the processing proceeds to step S76, where an error code is generated. Then the processing proceeds to step S77.

At step S77, the server system 1 transmits to the navigation terminal 5 the session key with the valid time or the error code. When receiving the notification of the arrival of such information at step S78, in the navigation terminal 5, it is determined whether or not the session key has been received (step S79). If the session key has been received (YES at step S79), the session key and its valid time as well as the user ID, access key and license number are stored in the memory unit 20 of the navigation terminal 5 (step S80), and then the processing is terminated. Further, when the session key has not been received (NO at step S79), the processing is also brought to an end.

Incidentally, the above series of processes for obtaining the session key is started, provided that the user commands the performance of the normal access on condition that the session key has not been stored in the memory unit 20 of the navigation terminal 5, the session key has suffered an error, or the valid time given to the session key has been expired (i.e., error).

Figure 11:
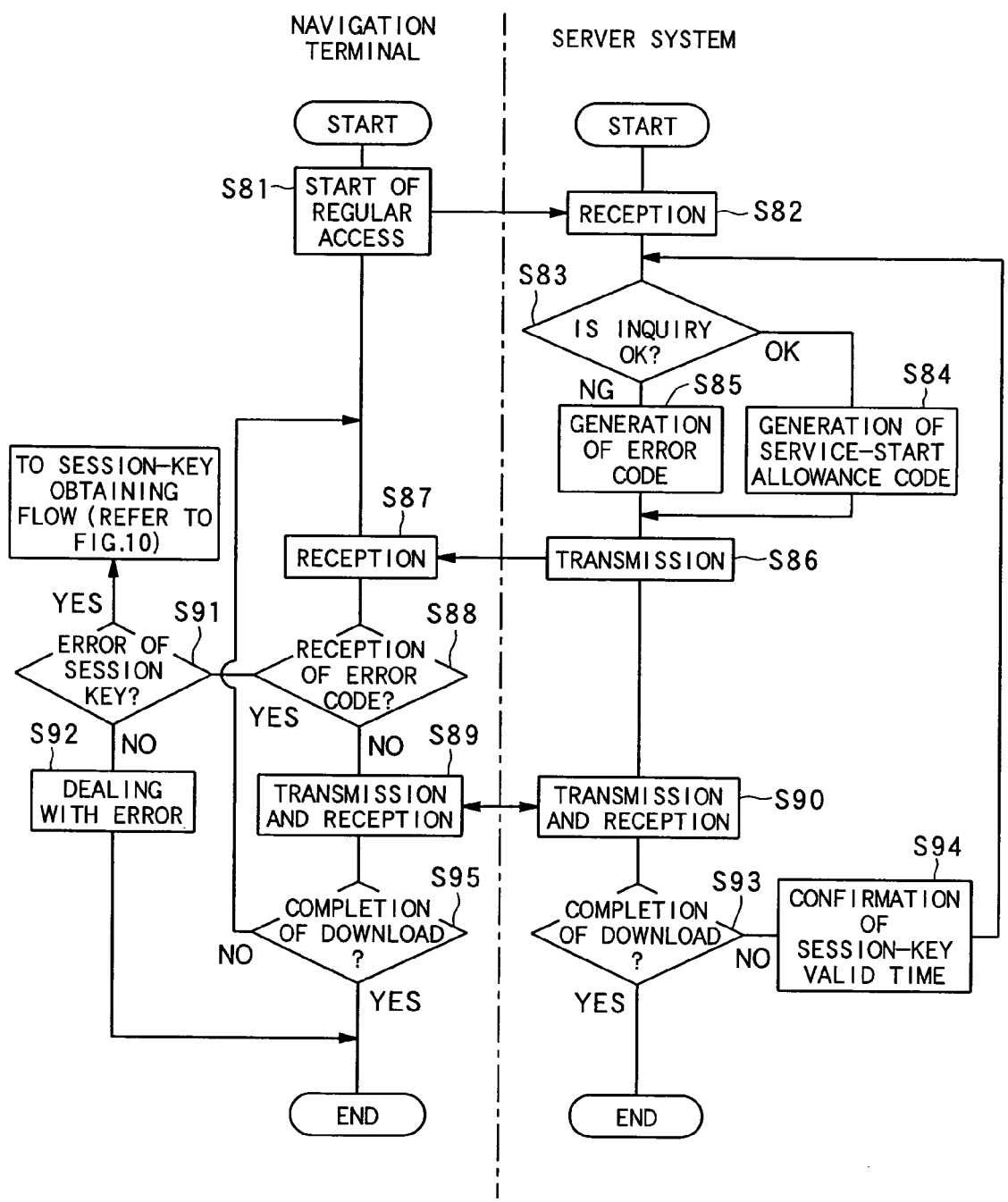
FIG. 11 details the processing at steps S5 and S6 in FIG. 6, which is the processing for authentication of a normal access.

FIG. 11 shows in detail the processing carried out at steps S5 and S6 in FIG. 6, which is a flowchart for authenticating the normal access.

As shown in FIG. 11, in the normal-access authentication processing, the normal access is started by transmitting both the user ID and the session key from the navigation terminal 5 to the server system 1 (step S81). On reception of those pieces of information, the server system 1 determines if the user ID has already been registered or not and both the user ID and session key are valid or not, in addition to an inquiry for other items, such as confirmation of the session-key valid time and an agreement for being serviced from the server system 1 (steps S82 and S83). When this inquiry results in an affirmative result (OK), the processing is made to proceed to step S84, where a code for permitting the start of service, such as supply of map data, is generated. In contrast, when the inquiry shows a negative result (NG), the processing at step S85 will be carried out to generate an error code, before being shifted to step S86.

At step S86, from the server system 1 to the navigation terminal 5, either the service start permission code or the error code is transmitted. Then, at step S87, responsively to receiving either one of the two types of codes, the navigation terminal 5 determines if the received code is the error code or not (step S88). If the error code has not been received (NO at step S88) (that is, the service start permission code has been received), the navigation terminal 5 operates to send to the server system 1 a command to request the start of the service, with the result that contents that have been desired, such as map data, can be sent from the server system 1 to the navigation terminal 5 (steps S89 and S90).

Meanwhile, in the case of reception of the error code (YES at step S88), it is determined at step S91 whether or not the session key has encountered an error. If there occurs an error in the session key (YES at step S91), the processing is made to return to the session key obtaining processing described in FIG. 10. However, there is no error in the session key (NO at step S91), the processing come to an end after error processing at step S92.

Concurrently, the server system 1 determines if the download has been completed or not (step S93). To be specific, it is determined whether or not the transmission of contents which should be provided to the navigation terminal 5 have been completed. If such transmission has yet to be completed (NO at step S93), the valid time (for example, 5 minutes) of the session key is confirmed at step S94, and then the processing goes back to the determination carried out at step S83. When the download has been completed (YES at step S93), the server system 1 ends the processing thereof.

In the above example, the valid time of the session key is not limited to 5 minutes, but this is just an example and can be set to a desired amount of time, for example, depending on the volume and/or contents of data to be sent to the navigation terminal 5.

In addition, the navigation terminal 5 determines whether or not the desired contents, such as map data, has been downloaded completely (step S95). That is, it is determined if all the contents which should be downloaded from the server system 1 have been received or not. When the download has yet to be completed (NO at step S95), the processing is returned to the reception processing carried out at step S87, while when all the contents have been received (YES at step S95), the processing at the navigation terminal 5 ends.

As described above, the authentication system for communication apparatuses according to the present embodiment is equipped with the server system 1, in which the common authentication unit 12 and system controller 13 are placed. The common authentication unit 12 authenticates user accounts sent from the PC 3, generates an access key based on the user accounts, and allows the generated access key to be transmitted from the server system 1 to the navigation terminal 5. The common authentication unit 12 also authenticates the access key sent from the navigation terminal 5, generates a session key to access data to be serviced, such as map data, on the basis of the access key, and allows the generated session key to be transmitted from the server system 1 to the navigation terminal 5. The system controller 13 permits an access of the navigation terminal 5 to the server system 1 on the basis of the session key within only a given period of time (that is, a period of valid time given to the session key). Thus, the given period of time assigned to the session key makes it possible that the authentication can be performed with as few uses of passwords as possible under the environment with no use of the SSL protocol. Accordingly, even if a communication terminal 2 with a CPU and a memory whose data storage capacity is smaller is used, a data transfer speed can be avoided from being reduced. Further, unauthorized accesses to the server system 1 can be prevented, so that security for this authentication system is raised remarkably.

Still, in the present embodiment, the first key information is composed of the access key to permit an access to the server system, while the second key information is composed of the session key to permit an access to the data stored in the server system. Hence, for performing the authentication with no use of the SSL, passwords can be replaced by such keys.

Still further, in the present embodiment, the communication terminal 5 is composed of any one selected from a group of the navigation terminal 5, PC3, and mobile phone 4. This group may include a personal digital assistant. Thus, the communication terminal is higher in versatility in selecting a desired one and use thereof.

Second Embodiment

Figure 12:
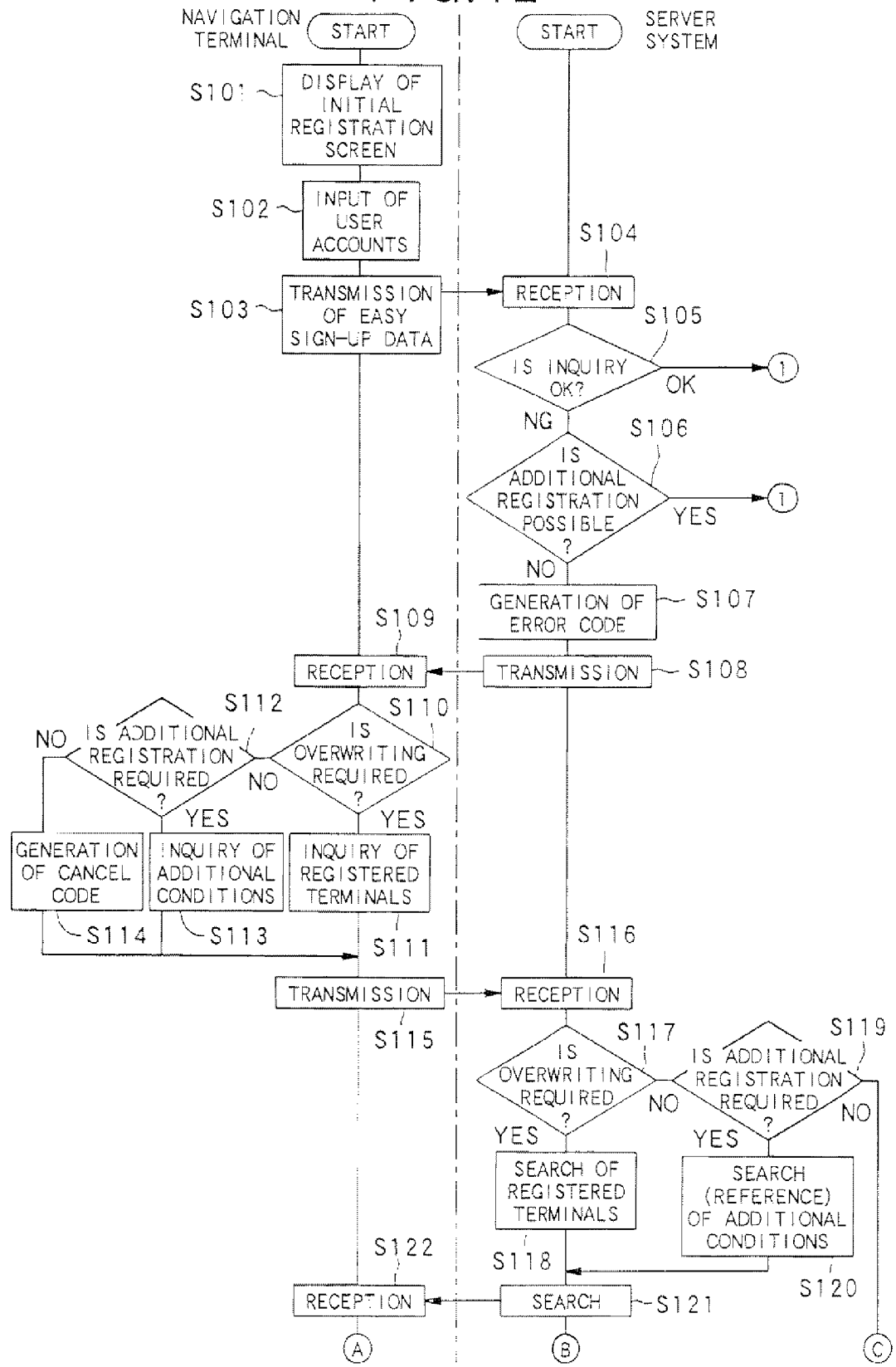
FIG. 12 is a flowchart indicating the processing for addition a communication terminal, which is carried out by an authentication system according to a second embodiment of the present invention.
Figure 13:
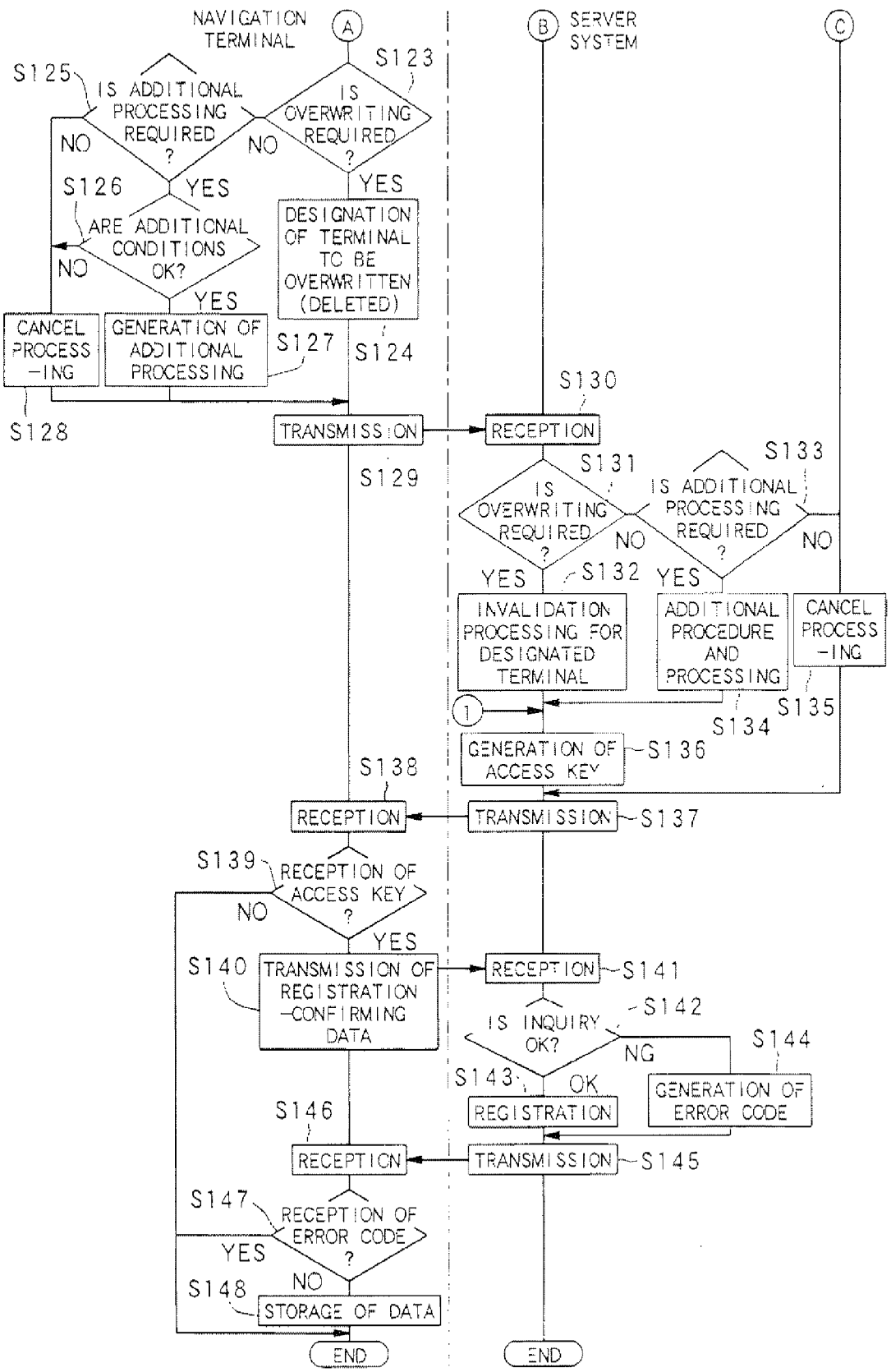
FIG. 13 is a flowchart showing the addition processing carried out in the second embodiment.

Referring to FIGS. 12 to 14, a second embodiment of the present embodiment will now be explained. This second embodiment will exemplify registration for assigning a plurality of communication terminals to one access key. Such a practical case is that one person owns a plurality of vehicles on each of which a navigation terminal is mounted and one access key is given in common to the plural vehicles.

Still, the second embodiment will be explained about the case that, provided each of two vehicles (consisting of the first and second vehicles) has each of two navigation terminals (consisting of the first and second navigation terminals) mounted thereon and a user ID, password, license number, and access key has already been granted to the first navigation terminal, this access key is therefore to be registered to the second navigation terminal.

FIG. 12 shows the processing for adding communication terminals, which is carried out in the authentication system according to the second embodiment. In this processing, on the display unit 19 of the second navigation terminal 5 is displayed an initial registration screen, which is filled in with user accounts (i.e., user ID, password and license number) given to the first navigation terminal 5 in advance (steps S101 and S102). Then, these user accounts, which compose easy sign-up data, are transmitted, together with a manufacture ID and a model number ID given to the second navigation terminal 5, from the second navigation terminal 5 to the server system 1 (step S103).

On reception of the easy sign-up data, the server system 1 performs authentication through an inquiry whether or not the received user ID has been registered in the server system 1, whether or not both the received user ID and password is valid, and an access key is yet to be issued (steps S104 and S105). When the inquiry shows a negative result (NG), it is further determined at step S106 if or not it is possible to conduct additional registration. In the case that the additional registration is impossible to perform (NO at step S106), the processing is shifted to step S107, wherein an error code is generated, before going to step S108.

The above determination whether or not the additional registration is executable is employed to take into account a limit in the number of vehicles allowed to participate in the additional registration and a situation that a service provider does not allow the additional registration. For instance, in the case that, due to the service provider's setting, the number of vehicles allowed to participate in the additional registration with no additional charge is two, the determination at step S106 becomes negative (NO) for the additional registration of the third vehicle. In this case, the user is obliged to abandon the additional registration or delete (overwriting) one or more navigation terminals 5 that have been registered. How the additional registration is set up depends on the specifications given by a service provider. It is therefore possible to allow three or more vehicles (in the above example) to be registered additionally for an extra charge.

Then at step S108, the server system 1 transmits to the second navigation terminal 5 information indicating that the additional registration is impossible so that overwriting (switchovers of vehicles to be registered) or additional registration is needed. In this way, in cases where only one navigation terminal is allowed to be registered on one access key and the number of navigation terminals that are allowed to be registered to one access key has already reached a predetermined limit, the server system 1 notifies the user that the additional registration has been rejected. To avoid the rejection, the navigation terminal 5 according to the present embodiment is set up to have the scheme that one or more navigation terminals 5 that have been registered are deleted and a new one is added thereon (i.e., vehicles to be registered are switched over on the basis of an overwriting). The scheme may be set up in such a manner that an extra charge allows additional registration without deleting one or more navigation terminals 5 that have been registered.

When receiving the information indicating that the additional registration is impossible so that overwriting or additional registration is needed, the second navigation terminal 5 determines, in response to a user's operation, which one to choose between the overwriting and the additional registration (steps S109 and S110). In the case that the overwriting is chosen, the second navigation terminal 5 makes inquiries with the server system 1 about which one or more navigation terminals have been registered (step S111). By contrast, the overwriting is not determined at step S110, it is further determined at step S112 whether or not the additional registration is required. If the additional registration is desired (YES at step S112), the second navigation terminal 5 makes inquiries with the server system 1 about additional conditions required for the additional registration (step S113). However, provided the additional registration is not desired (NO at step S112), a cancel code is generated at step S114. Thus, the second navigation terminal 5 will transmit, to the server system 1, the registered-terminal (navigation terminal) inquiry information, additional-condition inquiry information, or cancel code (step S115).

Hence the server system 1 receives the foregoing inquiry information or cancel code (step S116), and determines if the inquiry is about the overwriting or not (step S117). If the inquiry concerns the overwriting (YES at step S117), the one or more registered terminals (navigation terminals) are searched (step S118), while if the inquiry is not directed to the overwriting (NO at step S117), a further determination is made about whether or not the additional registration is desired (step S119). Provided the additional registration is desired (YES at step S119), additional conditions are searched (referred) at step S120. Concretely, at step S120, the additional conditions for additionally registering terminals (navigation terminals), such as extra charges and agreement contents, are read out to return it to the second navigation terminal 5 (step S121).

Responsively, the second navigation terminal 5 receives searched results of the registered terminals (navigation terminals) and the additional conditions (step S122). As shown in FIG. 13, in the case of the overwriting processing (YES at step S123), the second navigation terminal 5 responds to a user's operation to designate a navigation terminal to be deleted by overwriting a new one thereon. In contrast, in the case that the overwriting is not intended (NO at step S123), a further determination whether or not the additional registration is desired is determined at step S125. When the additional registration is desired (YES at step S125) with the additional conditions acceptable for the user (YES at step S126), an additional processing code is generated (step S127). On the other hand, the additional registration is not desired (NO at step S125) or the additional conditions are not acceptable for the user (NO at step S126), processing for canceling the additional registration is carried out.

Furthermore, the second navigation terminal 5 sends out, to the server system 1, information indicating the one or more terminals (navigation terminals) to be deleted (to be subjected to the overwriting), which is designated at step S124, or the additional processing code generated at step S127 (step S129).

The server system 1 receives, at step S130, information about the terminals to be deleted (to be subjected to the overwriting) or the additional processing code. For the overwriting (YES at step S131), processing for invalidating one or more designated terminals (navigation terminals) is carried out (step S132). Meanwhile, in the case that the overwriting is not desired (NO at step S131), it is further determined if the additional registration is intended or not (step S133). When this determination shows the additional registration (YES at step S133), processing for the addition of terminals is executed (step S134), while when no additional registration is determined (NO at step S133), cancellation processing is performed (step S135).

The above additional registration of one or more navigation terminals results in that, in cases where a plurality of access keys are issued for one user ID, there is provided a data structure shown in FIG. 14A, while, in cases where one access key is owned by a plurality of navigation terminals, there is provided a data structure shown in FIG. 14B. After this additional registration, an agreement with a user's communication line service is updated.

Still, in the server system 1, the processing for invalidating one or more designated terminals (step S132) or the processing for the addition of terminals (step S134) is followed by generating an access key (step S136). Then the generated access key or information about the cancel processing carried out at step S135 is sent to the second navigation terminal 5 (step S137). Further, in cases where the inquiry provides a positive result (OK) (step S105 in FIG. 12) or the determination shows that the additional registration is executable (step S106 in FIG. 12), the processing is made to skip to step S136, where the access key is also generated, as described above.

Meanwhile, the second navigation terminal 5 receives the access key or the information in relation to the cancel processing is received at step S138, and then determines whether or not the received information is the access key at step S139. If the received information is determined as being the access key (YES at step S139), data for confirming the registration is sent to the servers system 1 (step S140). However, when the received information is not concerned with the access key (NO at step S139), the processing in the second navigation terminal 5 is ended.

Responsively to the transmission from the second navigation terminal 5 (step S140), the registration confirming data is received by the server system at step S141. This registration confirming data is then subjected to inquiry, and if the inquiry is found to be no problem (OK), the corresponding access key is registered (steps S142 and S143). By contrast, the inquiry shows some problems (NG), an error code is generated (step S144). Then the access key or the error code is sent from the server system 1 to the second navigation terminal 5 (step S145).

In the second navigation terminal 5, information about the access key or the error code is received at step S146, and if such information shows the error code (YES at step S147), the processing in the second navigation terminal 5 is ended. If such information does not show the error code (NO at step S147), that is, the access key has been received, the information indicative of the access key is stored in the memory unit 20 (step S149).

As described above, even when the same user uses a further navigation terminal 5 to transmit the user accounts, the authentication system according to the present embodiment has the capability of coping with such a case. Practically, the authentication system operates in such a manner that an access key generated based on such user accounts is set to the same access key as that which has already been present and is provided. In other words, the same access key is given the same user, with the result that each user is able to handle a plurality of navigation terminals 5 based on the same access key.

Third Embodiment

Figure 15:
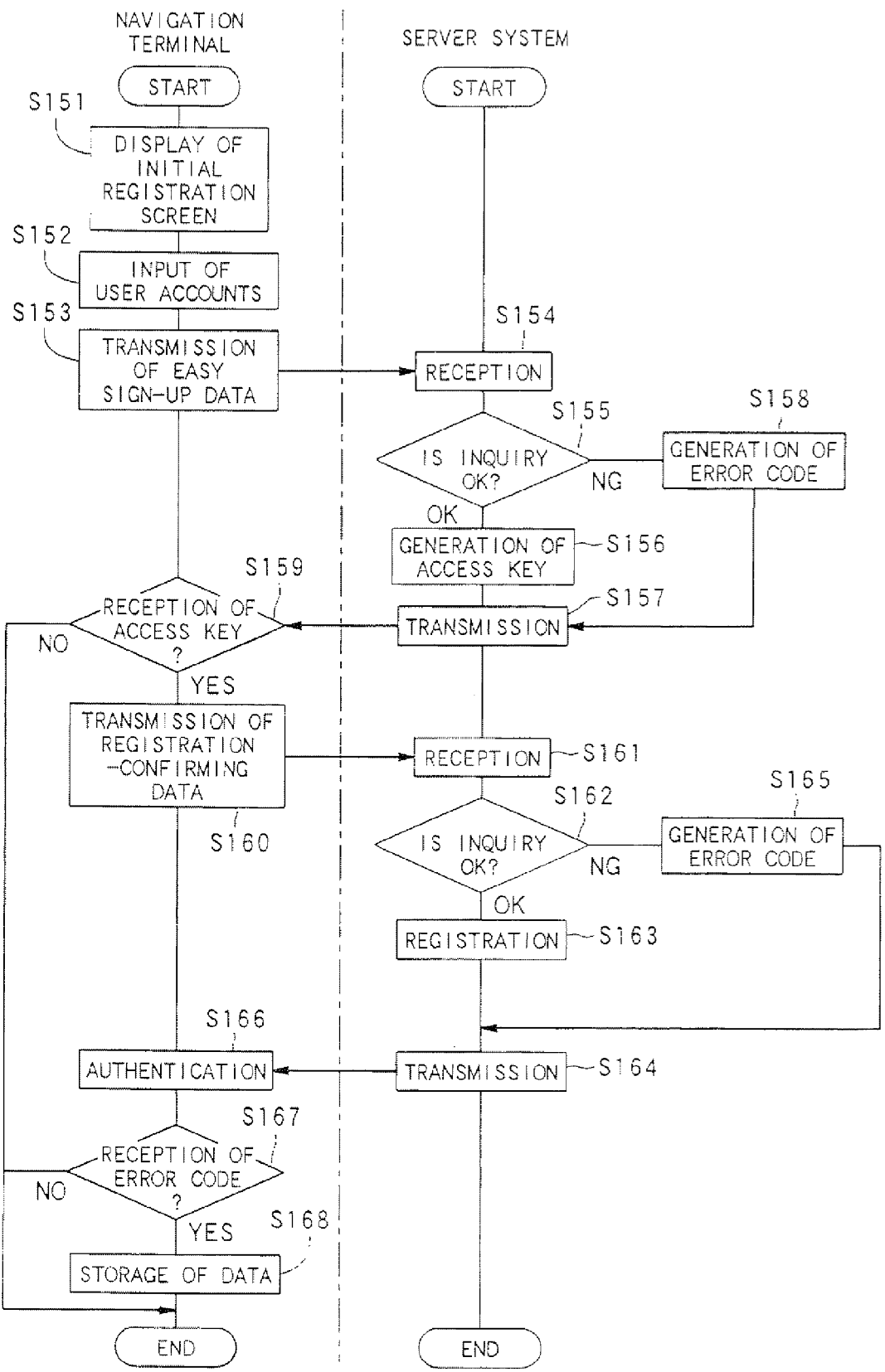
FIG. 15 is a flowchart indicating the processing for easy sign-up, which is carried out by an authentication system according to a third embodiment of the present invention.

Referring to FIG. 15, a third embodiment of the authentication system according to the present invention will now be described. The present embodiment features easy sign-up processing, which is shown in FIG. 15. In the present embodiment, the easy sign-up processing is employed on condition that the hardware number of a navigation terminal 5 used by a user can be acquired as system identifying information and the user registration has been completed (i.e., a user's credit number has been inputted).

As shown in FIG. 15, the easy sign-up processing starts by displaying an initial registration screen on the display unit 19 of the navigation terminal 5 and by making a user input user accounts (user ID and password) on the screen (steps S151 and S152). As in the present invention, in the case that the hardware number can be acquired without their redundancy, there is no necessity of inputting the license number in inputting the user accounts.

Then, the navigation terminal 5 transmits, to the server system 1 via the Internet IN, the user ID, password, and hardware number, together with the manufacturer ID and model number ID given to the navigation terminal 5, as easy-sign-up data (step S153).

On reception of the easy sign-up data, the server system 1 will authenticate the received data by making inquiries consisting of whether or not the user ID has been registered in the server system 1, whether or not there is a consistency between the user ID and the password, and whether or not the access key has yet to be issued, respectively (steps S154 and S155). If the authentication shows an affirmative result (OK), the processing is made to go to step S156 at which an access key is generated, before proceeding to step S157. On the other hand, the authentication at step S155 results in a negative answer (NG), an error code is generated at the next step S158, and then the processing proceeds to step S157.

At step S157, either the access key or the error code is sent from the server system 1 to the navigation terminal 5. In response to this transmission, the navigation terminal 5 determines if the access key has been received (step S159). When the access key has been received (YES at step S159), the user ID and the access key, which compose registration-confirming data, are returned to the server system 1 (step S160). However, there has been no reception of the access key (NO at step S159), the processing is ended.

The server system 1, which receives both the access key and the user ID, makes an inquiry whether or not both of the received address key and the user ID are valid (steps S161 and S162). If the inquiry proves to be affirmative (OK), the hardware number, manufacture ID, model number ID and access key are registered newly at step S163, before making the processing go to step S164. The server system 1 is able to identify a navigation terminal 5 in such a case as handovers of navigation terminals 5, on condition that the user accounts (such as a user ID and license number) has already been registered and the hardware number (system number) is registered at step S163.

On the other hand, if the inquiry is turned out to be negative (NG) at step S162, an error code is generated at step S165, before the performance at step S164.

Then, at step S164, from the server system 1 to the navigation terminal 5, a notification that the registration has been completed or the error code is sent. Responsively, the navigation terminal 5 receives either the registration-completion notification or the error code for authentication (step S166). If it is turned out that the error code has been received (YES at step S167), the processing is ended. In contrast, if the error code has not been received (NO at step S167), the navigation terminal 5 stores the user ID and the access key into its memory unit 20, and then terminates the processing (step S168). The access key is memorized by the memory unit 20 in an invisible form for the user, while the password is not preserved in the memory unit 20.

As described above, as the system-identification information which is preset to the navigation terminal 5, the hardware number thereof is used. Such a hardware number is inputted and sent to the server system 1, together with the manufacture ID, model number ID, access key and user accounts. In other words, the server system 1 receives the hardware number of the navigation terminal 5 as well, which further enhances the security in this authentication system.

Fourth Embodiment

Figure 16:
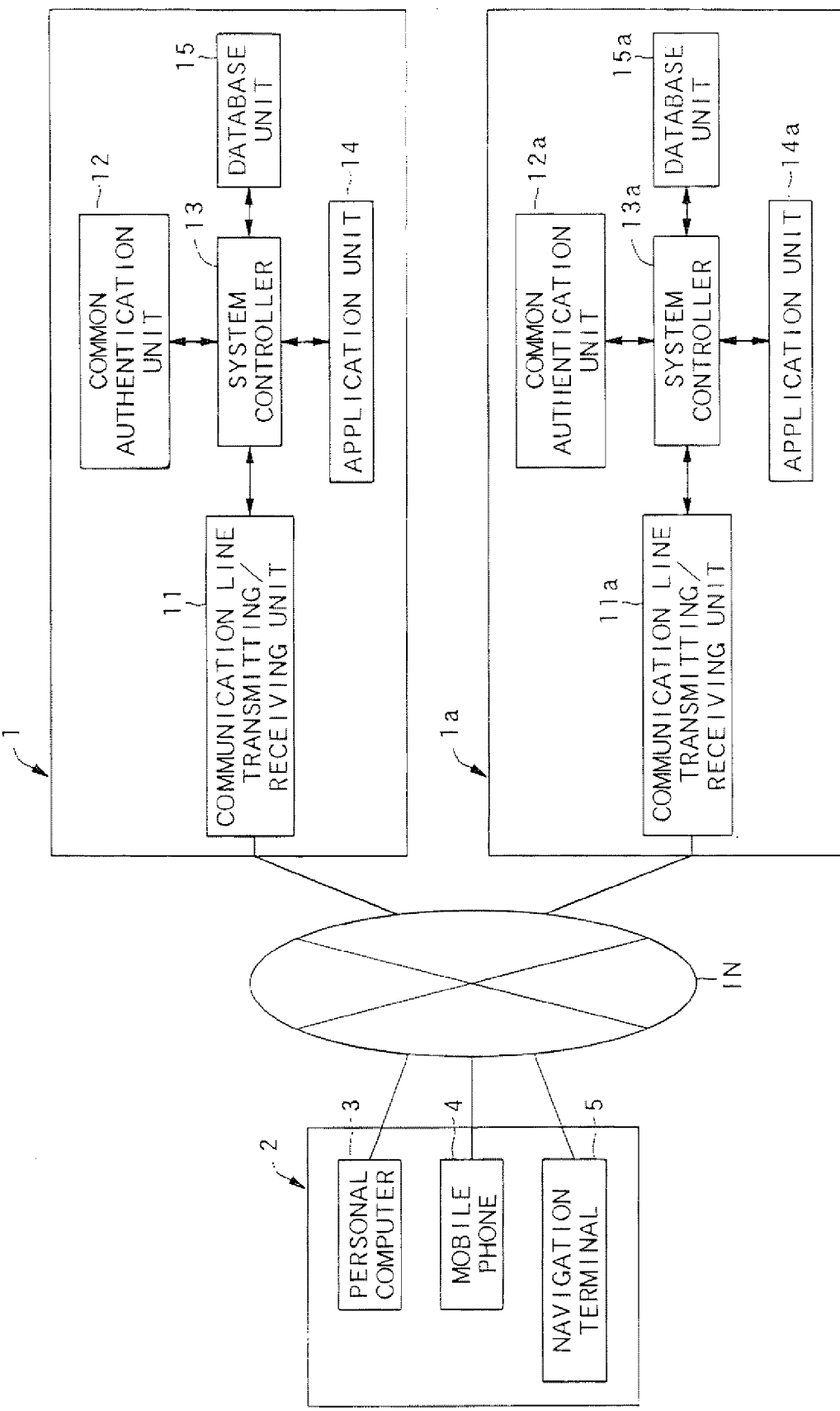
FIG. 16 is a block diagram showing a schematic configuration of an authentication system according to a fourth embodiment of the present invention.
Figure 17:
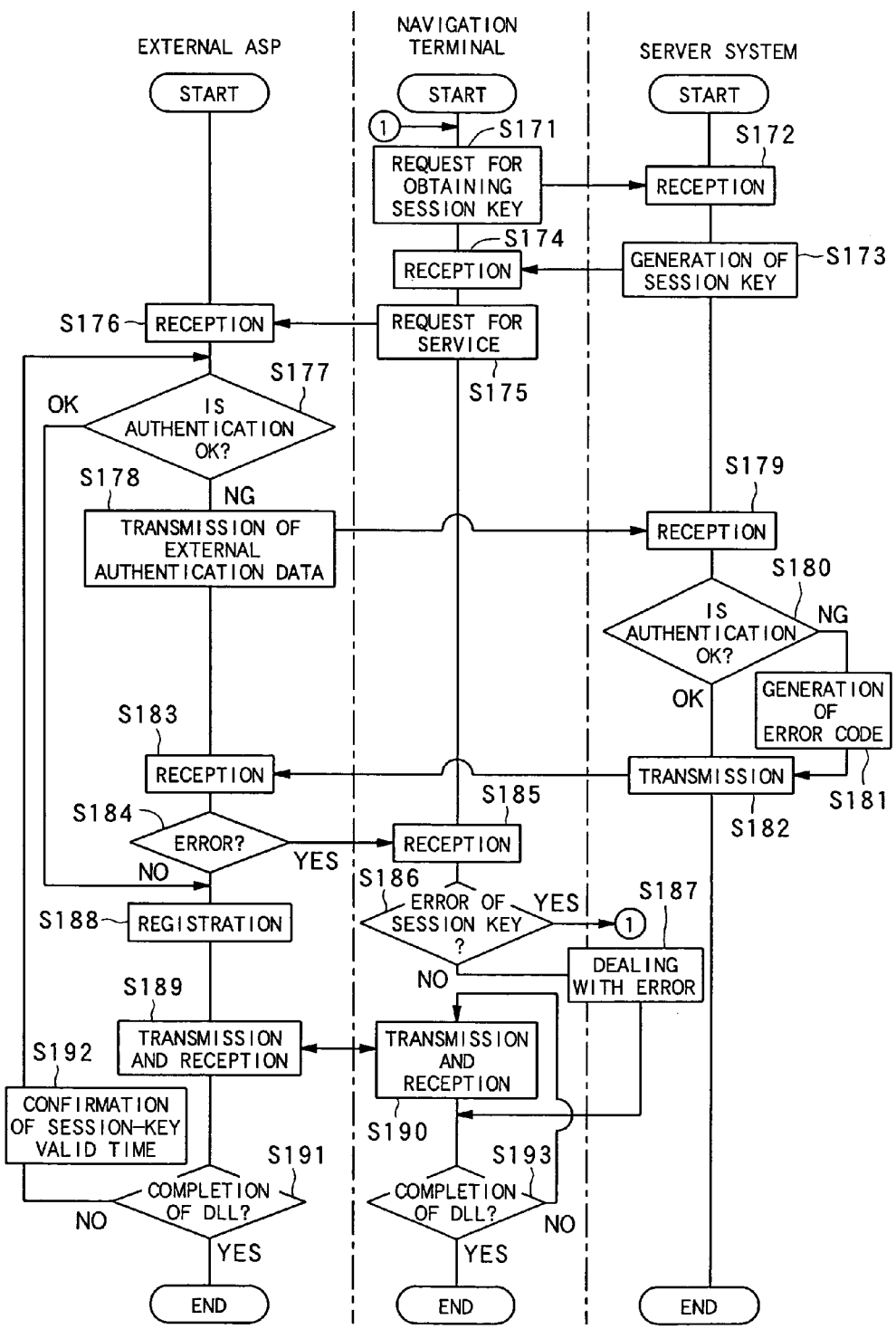
FIG. 17 is a flowchart explaining the processing carried out in the fourth embodiment.

Referring to FIGS. 16 and 17, a fourth embodiment of the authentication system according to the present invention will now be described. In FIG. 16, the components which are the same as or similar to those illustrated in FIG. 1 will now be noted by the references which are the same as those in FIG. 1.

An authentication system according to the present embodiment is provided with a first server system that generates a session key serving as the second key information and a second server system that is different from the first one and serves as an external ASP (Application Service Provider), the second server system having a common authentication unit that functions as third authentication means for authenticating the session key generated by the first server system.

As shown in FIG. 16, the authentication system has both of the server system 1 (i.e., the first server system) composed as shown in FIG. 1 and a further server system 1a (i.e., the second server system) which is formed as an external ASP and composed in the similar manner to the server system 1. Hereafter the further server system 1a is referred to as "external ASP."

Like the server system 1 shown in FIG. 1, the external ASP 1a is provided with a communication line transmitting/receiving unit 11a, a common authentication unit 12a that functions as the third authentication unit of the present invention for authenticating a session key generated by the server system 1, a system controller 13a, an application unit 14a, and a database unit 15a of which storage is composed of, for example, a hard disk device. The server systems 1 and the external ASP 1a are both connected to the communication terminals 2 in a communicable manner.

The communication line transmitting/receiving unit 11a works as an interface between the Internet IN (i.e., to each communication terminal 2) and the system controller 13a in the external ASP 1a. Practically, the communication line transmitting/receiving unit 11a performs a predetermined type of processing on a provider signal provided via the internet IN, and supplies the signal resultant from the processing to the system controller 13a. Further, in response to receiving from the system controller 13a a provider signal to be transmitted to the server system 1 or a specific communication terminal 2, the communication line transmitting/receiving unit 11 applies a predetermined type of processing to the signal such that the processed signal is sent, as the provider signal from the external ASP 1a, to the server system or the communication terminal 2 via the internet IN.

The common authentication unit 12a is configured to make an authentication cache storage installed therein, so that it can be determined if both of a user ID and a session key are valid or not. This makes it possible to authenticate a session key generated by the server system 1. Accordingly the unit 12a is in charge of administrating the user ID and session key.

The system controller 13a is responsible for control to permit an access based on the foregoing session key, as a valid access, to be performed during a given interval of time, in addition to control of each component necessary for processing both of data that has been received via the communication line transmitting/receiving unit 1 1a and data stored in the database 15a.

The application unit 14a is configured to analyze the data sent from the user and to instruct the system controller 13a to acquire, from the database unit 15a, data required in the analysis.

The database unit 15a memorizes all kinds of data necessary for navigation processing, including data indicative of a user ID, session key, and expiration time of the session key; map data to be displayed on a display screen of the navigation terminal 5; various kinds of data required for route processing; both positional data and content data at various points on a map to be displayed on the display screen of a navigation terminal 5; point data necessary for execution of navigation processing; and users' data about users who use the navigation terminal 5. These kinds of data are read out at necessary timing from the database 15a and sent to the system controller 13a.

Incidentally, the configurations and operations of both the server system 1 and the communication terminals 5 are identical to those in the first embodiment, thus omitting them from being explained.

With reference to FIG. 17, the processing carried out in this embodiment will now be outlined. The processing for obtaining a session key and the processing for the normal access are carried out similarly to those explained in FIGS. 10 and 11.

As shown in FIG. 17, in this processing, a request for obtaining a session key is sent from a navigation terminal 5 to the server system 1 via the Internet IN (step S171). In response to this request, the server system 1 generates a predetermined session key of which valid time is for example 5 minutes (steps S172 and S173). Thus, the navigation terminal is able to receive information indicating the session key and the valid time thereof from the server system 1. By the way, if it is found in the processing at steps S173 and 174 that the navigation terminal 5 that has issued the request for obtaining the session key holds a session key of which time is still valid, a new session key will not be generated. In this case, an instruction for continued use of the session key that has already been stored by the navigation terminal 5 is issued to the navigation terminal 5.

When receiving the information indicative of the session key, a valid period of time given to the session key, and others, the navigation terminal 5 sends information in relation to a user ID, the session key and others to the external ASP 1a in order to request a service (steps S174 and S175).

Meanwhile, the external ASP 1a receives the information in relation to a user ID, the session key and others (step S176), and then moves its processing to step S177 to make reference to an authentication cache storage, with the result that the validity of both the user ID and the session key is determined. Namely when this is the first access, the determination at step S177 shows a negative result (i.e., NG). By contrast, when the valid time of the session key has not been expired yet and this is the second access or subsequent access thereafter, the determination at step S177 shows a positive result (i.e., OK).

In the case of NG at step S177, information about the user ID, session key, service ID, and ID of the external ASP 1a is sent to the server system 1 as external authentication data.

Hence, the server system 1 receives the external authentication data, and then performs authentication on the information about the user ID, session key, service ID and ID of the external ASP 1a (step S179 and S180). When this determination becomes negative (NG), an error code is generated at step S181, before being moved to step S182. In contrast, the foregoing determination becomes positive (OK), the processing is made to directly proceed to step S182. At step S182, either the external authentication data or the error code is sent from the server system to the external ASP 1a.

In response to the reception of either the external authentication data or the error code, the external ASP 1a performs whether or not the received information is the error code (steps S183 and S184). In the case of the error code (YES at step S184), the error code is transmitted from the external ASP 1a to the navigation terminal 5. Thus the navigation terminal 5 receives the error code to determine whether or not the error code results from a session key error (steps S185 and S186). When this determination shows the session key error (YES at step S186), the processing is returned to step S171 to again make the navigation terminal 5 issue the session-key obtaining request to the server system 1. In contrast, when the determination reveals that the error is not resulted from the session key error (NO at step S186), the processing proceeds to step S187 to cope with the error by a predetermined measure, and then proceeds to step S193 where later-described processing for determining completion of DLL (Dynamic Link Library) is carried out.

Meanwhile, when it is determined at step S184 that no error code has been received (NO at step S184), the user ID, session key, and a valid time of the session key are registered into the external ASP 1a. In this case, the valid time is a period of time calculated by adding, to a session-key obtained time instant, a remaining time for obtaining session keys. In this way, the external ASP 1a adopts, as a session-key valid time, a remaining time of period in a valid period of time given to the session key. Accordingly, it is possible to avoid influence resulting from a difference in time between the server system 1 and the external ASP 1a.

Then the external ASP 1a starts to serve the navigation terminal 5, so that contents of a desired type, such as map data, are supplied to the navigation terminal 5 (steps S189 and S190). Further, in the external ASP 1a, it is determined whether or not the transmission of all contents which should be directed to the navigation terminal 5 has been completed at step S191. In other words, at step S191, it is checked if the DLL has been completed or not, and if the DLL has yet to be completed (NO at step S191), the processing moves to the confirmation of the session-key valid time at step S192, and then returns to the authentication at step S177. In contrast, it is found that the transmission of all the contents has been completed (YES at step S191), the processing of the external ASP 1a is ended.

On the other hand, in the navigation terminal 5, whether or not all the contents have been received is performed. Until all the contents can be received, the transmitting and receiving processing to and from the external ASP 1a is kept continued (step S190). On completing the reception of all the contents (YES at step S193), the processing of the navigation terminal 5 is also ended.

Although the present embodiment has been explained in such a manner that the external ASP 1a is communicably coupled with the server system 1 and the communication terminals 2 via the Internet IN, this is not a definitive list. For instance, an alternative is to employ a dedicated line with which the Internet is replaced.

As described above, the common authentication unit 12a that authenticates a session key generated by the server system 1 is installed in the external ASP 1a separated from the server system 1. It is therefore possible to reduce the capacity required for the CPU incorporated in the server system 1.

Furthermore, in the present embodiment, the external ASP 1a decides a period of time that permits a user to access to data to be serviced, such as map data, on the basis of a time instant at which a session key is obtained and a period of time remaining in a period of valid time given to the session key. Hence the external ASP 1a is able to provide a period of time for access in a precise and stable manner.

By the way, in the foregoing various embodiments, the authentication system according to the present invention is applied to a communication car navigation system in which authentication is applied to users who operates the navigation terminal 5 (i.e., communication terminal) mounted on a vehicle and data services are carried out depending on authenticated results. However, the authentication system of the present invention is not limited to such a configuration. Other communication terminals, such as PCs 3 and mobile phones 4, incorporated in an authentication system may be subjected to the authentication scheme.

Further, the foregoing embodiments may use, other communication means, a communication network based on a dedicated line or a public circuit, instead of the Internet.

Still further, the communication terminal which can be adopted in the present invention is not limited to the PC, mobile phone, or navigation terminal exemplified in the foregoing embodiments, but a variety of types of mobile terminals with a communication performance or home electric appliances with a communication performance may be adopted as well.

Programs that realize the functions illustrated by flowcharts shown in FIGS. 6 to 17, except for FIGS. 14 and 16, can be memorized by information recording mediums, such as flexible disks or hard disks, from which computers read out the program data. This makes it possible that the computers are made to function as the server system 1 or external ASP 1a described in the foregoing embodiments.

For the sake of completeness, it should be mentioned that the embodiments explained so far are not definitive lists of possible embodiments of the present invention. The expert will appreciates that it is possible to combine the various construction details or to supplement or modify them by measures known from the prior art without departing from the basic inventive principle.

The entire disclosure of Japanese Patent Application No. 2002-189072 filed on Jun. 28, 2002 including the specification, claims, drawings and summary is incorporated herein by reference in its entirety.

What is claimed is:

1. An authentication system comprising a server system communicably connected to a communication terminal via a communication network, wherein a user handles the communication terminal to access data stored in the server system via the communication network, the server system comprising:

a first authentication unit configured to receive user-identifying information from the communication terminal via the communication network, authenticate the user-identifying information, and generate first key information based on the authenticated user-identifying information, the first key information being transmitted to the user;

a second authentication unit configured to receive the first key information from the communication terminal via the communication network, authenticate the first key information every time the first key information is received, and generate new second key information based on the same first key information every time the first key information is received, the new second key information generated each time entitling the user to access the data in the server system for a specified period of time as long as the communication terminal is activated, the second key information being transmitted to the communication terminal via the communication network; and an access permitting unit configured to receive the second key information from the communication terminal via the communication network and permit the user to access the data in the server system for the specified period of time every time the user accesses the server system.

2. The authentication system according to claim 1, further comprising a second server system which is connected to the communication network and different from the server system generating the second key information, wherein the second server system comprises a third authentication unit configured to authenticate validity of the second key information.

3. The authentication system according to claim 2, wherein the second server system is configured to set a period of time to permit the user to access the data on the basis of both of a time instant at which the second key information is generated and a time remaining in the specified period of time set for the access to be carried out using the second key information.

4. A server system for use in an authentication system and which is conimunicably connected with a communication terminal via a coniniunication network, wherein a user handles the communication terminal to access data stored in the server system via the communication network, the server system comprising:

a first authentication unit configured to receive user-identifying information from the communication terminal via the communication network, authenticate the user-identifying information, and generate first key information based on the authenticated user-identifying information, the first key information being transmitted to the user;

a second authentication unit configured to receive the first key information from the communication terminal via the communication network, authenticate the first key information every time the first key information is received, and generate new second key information based on the same first key information every time the first key information is received, the new second key information generated each time entitling the user to access the data in the server system for a specified period of time as long as the communication terminal is activated and the second key information being transmitted to the communication terminal via the communication network; and an access permitting unit configured to receive the second key information from the communication terminal via the communication network and permit the user to access the data in the server system for the specified period of time every time the user accesses the server system.

5. The server system according to claim 4, wherein the first key information is an access key for accessing the server system to acquire the second key information and the second key is a session key for accessing the data in the server system and requesting transmission of the data.

6. The server system according to claim 4, in cases where the user-identifying information is transmitted using a second communication terminal other than the communication terminal handled by the user, the first authentication unit transmits, to the second communication terminal, a second access key generated based on the user-identifying information provided from the second communication terminal, the second access key being regarded as being the same as the previously-generated access key.

7. The server system according to claim 4, wherein the communication terminal is configured to provide terminal-identifying information to the server system together with the user-identifying information, wherein the terminal-identifying information is used for the authentication by the first authentication unit.

8. An authentication method carried out by a server system communicably connected to a communication terminal via a communication network, wherein a user handles the communication terminal to have access to data stored in the server system via the communication network, the method comprising:

receiving user-identifying information transmitted from the communication terminal via the communication network;

authenticating the received user-identifying information;

generating, only once, first key information based on the authenticated user-identifying information;

transmitting the first key information to the communication terminal;

receiving the first key information from the communication terminal via the communication network;

authenticating the received first key information every time the first key information is received;

generating new second key information based on the same first key information every time the first key information is received, the new second key information generated each time entitling the user to periodically access the data in the server system for a specified period of time as long as the communication terminal is activated;

transmitting the second key information to the communication terminal via the communication network;

receiving the second key information from the communication terminal via the communication network; and permitting the user to access the data in the server system for the specified period of time every time the user accesses the server system.

9. The authentication method according to claim 8, wherein the first key information is an access key for accessing the server system to acquire the second key information and the second key is a session key for accessing the data in the server system and requesting transmission of the data.

10. The authentication method according to claim 8, wherein the communication terminal provides terminal-identifying information to the server system together with the user-identifying information, wherein the authenticating of the user-identifying information uses the terminal-identifying information.

11. The authentication method according to claim 8, further comprising authenticating validity of the second key information.

12. The authentication method according to claim 8, wherein the generating of the second-key information includes the step of setting a period of time to permit the user to access the data in the server system on the basis of both of a time instant at which the second key information is generated and a time remaining in the specified period of time set for the access to be carried out using the second key information.

13. A computer program product comprising a computer readable medium having computer-readable program code embodied thereon, the program code, when executed, being adapted to carry out the method of claim 8.

14. An authentication method for authenticating a user terminal requesting access to data stored in a server system, the method comprising:

receiving secured user information from a user of the user terminal;

authenticating the received user information;

generating an access key based on the authenticated user information;

transmitting the access key to the user;

receiving the access key from the user terminal via a communication network at a time of a first request for accessing the data stored in the server system;

authenticating the access key received from the user terminal;

generating a session key based on the access key received from the user terminal;

transmitting the session key to the user terminal via the communication network;

receiving the session key from the user terminal via the communication network;

permitting the user terminal to access the data in the server system if the session key is received within some period of time subsequent to the transmitting of the session key to the user terminal via the communication network; and transmitting new session keys to the user terminal via the communication network in response to receiving the same access key from the user terminal via the communication network at times of additional requests for accessing the data stored in the server system subsequent to the time of the first request.

15. The method according to claim 14, wherein the secured user information is not received again at the subsequent times of the additional requests for accessing the data.

16. The method according to claim 14, wherein the secured user information is secured using a secure sockets layer protocol.

17. The method according to claim 14, further comprising:

receiving the same access key from at least one other, different user terminal;

generating a session key based on the access key;

transmitting the session key to the other user terminal via the communication network;

receiving the session key from the other user terminal via the communication network; and permitting the other user terminal to access the data in the server system if the session key is received within some period of time subsequent to the transmitting of the session key to the other user terminal via the communication network.

18. The method according to claim 14, further comprising:

generating at least one other access key based on the authenticated user information;

transmitting the other access key to at least one other different user terminal;

receiving the access key from the other user terminal via the communication network at a time of a first request for accessing the data stored in the server system;

authenticating the access key received from the other user terminal;

generating a session key based on the access key received from the other user terminal;

transmitting the session key to the other user terminal via the comunication network;

receiving the session key from the other user terminal via the communication network; and permitting the other user terminal to access the data in the server system if the session key is received within some period of time subsequent to the transmitting of the session key to the other user terminal via the communication network.

19. The method according to claim 14, further comprising:

receiving a hardware identifier transmitted from the user terminal over a communication network, wherein the authenticating is based on both the secured user information and the hardware identifier.

* * * * *